(12) United States Patent
Song et al.

(10) Patent No.: US 12,032,402 B2
(45) Date of Patent: Jul. 9, 2024

(54) TRANSCEIVER DEVICE, DRIVING METHOD THEREOF, AND DISPLAY SYSTEM INCLUDING TRANSCEIVER

(71) Applicant: SAMSUNG DISPLAY CO., LTD., Yongin-si (KR)

(72) Inventors: Jun Yong Song, Yongin-si (KR); Jong Man Bae, Yongin-si (KR); Jun Dal Kim, Yongin-si (KR); Hyun Su Kim, Yongin-si (KR); Kyung Youl Min, Yongin-si (KR); Dong Won Park, Yongin-si (KR); Tae Young Jin, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 122 days.

(21) Appl. No.: 17/574,077

(22) Filed: Jan. 12, 2022

(65) Prior Publication Data

US 2022/0397931 A1 Dec. 15, 2022

(30) Foreign Application Priority Data

Jun. 14, 2021 (KR) .......................... 10-2021-0077054

(51) Int. Cl.
*G06F 1/08* (2006.01)
*G06F 1/10* (2006.01)
*G06F 3/14* (2006.01)
*G09G 5/00* (2006.01)

(52) U.S. Cl.
CPC .................. *G06F 1/08* (2013.01); *G06F 1/10* (2013.01); *G06F 3/14* (2013.01); *G09G 5/008* (2013.01); *G09G 2370/10* (2013.01)

(58) Field of Classification Search
CPC .... G06F 1/08; G06F 1/10; G06F 3/14; G09G 5/008; G09G 2370/10
See application file for complete search history.

(56) References Cited

U.S. PATENT DOCUMENTS

| 3,701,948 | A  | 10/1972 | McAuliffe |
| 5,386,518 | A  | 1/1995  | Reagle et al. |
| 6,275,499 | B1 | 8/2001  | Wynn et al. |
| 6,388,591 | B1 | 5/2002  | Ng |
| 7,106,862 | B1 | 9/2006  | Blair et al. |
| 7,176,763 | B2 | 2/2007  | Park |
| 7,190,931 | B2 | 3/2007  | Casper et al. |

(Continued)

FOREIGN PATENT DOCUMENTS

| EP | 4105774 A1 | 12/2022 |
| EP | 4109233 A1 | 12/2022 |

(Continued)

*Primary Examiner* — Glenn A. Auve
(74) *Attorney, Agent, or Firm* — CANTOR COLBURN LLP

(57) ABSTRACT

A transceiver includes a transmitter and a receiver connected to each other by a first line and a second line. The transmitter transmits signals having a first voltage range to the first line and the second line in a first mode, and transmits signals having a second voltage range smaller than the first voltage range to the first line and the second line in a second mode. The transmitter encodes an original payload in the second mode to generate a first payload, and transmits the clock training pattern and the first payload through the first line and the second line.

18 Claims, 14 Drawing Sheets

(56) References Cited

U.S. PATENT DOCUMENTS

| | | | |
|---|---|---|---|
| 8,237,699 B2 | 8/2012 | Hong et al. | |
| 8,755,480 B1 | 6/2014 | Leong | |
| 9,466,263 B2 | 10/2016 | Bae et al. | |
| 9,735,950 B1* | 8/2017 | Liu | G06F 13/40 |
| 10,313,100 B2 | 6/2019 | Yim | |
| 10,516,400 B2 | 12/2019 | Huh et al. | |
| 10,587,491 B1 | 3/2020 | Volpe | |
| 10,649,946 B1 | 5/2020 | Brett et al. | |
| 10,657,875 B2 | 5/2020 | Chung et al. | |
| 10,726,808 B2 | 7/2020 | Han et al. | |
| 10,796,661 B2 | 10/2020 | Park | |
| 10,943,559 B2 | 3/2021 | Park | |
| 11,677,536 B2* | 6/2023 | Kim | H04L 7/0037 375/354 |
| 2003/0085736 A1 | 5/2003 | Tinsley et al. | |
| 2004/0263214 A1 | 12/2004 | Patterson | |
| 2005/0119025 A1 | 6/2005 | Mohindra et al. | |
| 2005/0168244 A1 | 8/2005 | Wijeratne | |
| 2007/0297552 A1 | 12/2007 | Bae et al. | |
| 2008/0189455 A1 | 8/2008 | Dreps et al. | |
| 2008/0267267 A1 | 10/2008 | Lee | |
| 2009/0052600 A1 | 2/2009 | Chen et al. | |
| 2009/0167750 A1 | 7/2009 | Hong et al. | |
| 2010/0091921 A1 | 4/2010 | Den Besten et al. | |
| 2010/0220748 A1 | 9/2010 | Inomata | |
| 2012/0063534 A1 | 3/2012 | Lin et al. | |
| 2012/0115952 A1 | 5/2012 | Visser et al. | |
| 2013/0093466 A1* | 4/2013 | Lee | H03L 7/22 327/40 |
| 2014/0118235 A1 | 5/2014 | Hong et al. | |
| 2015/0103038 A1 | 4/2015 | Han et al. | |
| 2015/0187293 A1 | 7/2015 | Yoo et al. | |
| 2015/0195211 A1* | 7/2015 | Sengoku | H04L 7/033 375/222 |
| 2015/0229467 A1 | 8/2015 | Lee et al. | |
| 2016/0056859 A1 | 2/2016 | Malhotra et al. | |
| 2016/0299870 A1 | 10/2016 | Mitric et al. | |
| 2021/0118356 A1 | 4/2021 | Lim et al. | |
| 2022/0399915 A1 | 12/2022 | Kim et al. | |

FOREIGN PATENT DOCUMENTS

| | | |
|---|---|---|
| KR | 100574980 B1 | 5/2006 |
| KR | 1020080011527 A | 2/2008 |
| KR | 101671018 B1 | 10/2016 |
| KR | 101938674 B1 | 1/2019 |
| KR | 1020190052186 A | 5/2019 |
| KR | 1020190055466 A | 5/2019 |
| KR | 102071573 B1 | 3/2020 |
| KR | 1020200024984 A | 3/2020 |
| KR | 1020200041406 A | 4/2020 |

* cited by examiner

TRANSCEIVER DEVICE, DRIVING METHOD THEREOF, AND DISPLAY SYSTEM INCLUDING TRANSCEIVER

This application claims priority to Korean Patent Application No. 10-2021-0077054, filed on Jun. 14, 2021, and all the benefits accruing therefrom under 35 U.S.C. § 119, the content of which in its entirety is herein incorporated by reference.

BACKGROUND

1. Field

Embodiments of the invention relate to a transceiver and a driving method of the transceiver.

2. Description of the Related Art

As an information technology is developed, an importance of a display device, which is a connection medium between users and information, has been highlighted. Therefore, a display device such as a liquid crystal display device, an organic light emitting diode display device, and the like has been widely used in various fields.

In general, a display device may perform internal communication using a mobile industry processor interface ("MIPI") protocol. In such a display device, a clock line may be separately used in using the MIPI protocol.

SUMMARY

In a display device where the clock line is used when performing internal communication, physical/spatial cost increases and power consumption increases.

Embodiments provide a transceiver including a transmitter that encodes data and transmits a clock training pattern and encoded data through a data lane without transmitting a clock signal.

Embodiments provide a driving method of the transceiver.

Embodiments provide a display system including the transceiver.

In accordance with an embodiment of the disclosure, a transceiver includes a transmitter and a receiver connected to each other by a first line and a second line. In such an embodiment, the transmitter transmits signals having a first voltage range to the first line and the second line in a first mode, and transmits signals having a second voltage range smaller than the first voltage range to the first line and the second line in a second mode. In such an embodiment, the transmitter encodes an original payload in the second mode to generate a first payload, and transmits a clock training pattern and the first payload through the first line and the second line.

According to an embodiment, the first line and the second line may be used in a single-ended manner in the first mode, and the first line and the second line may be used in a differential manner in the second mode.

According to an embodiment, the transmitter may mask an internal clock signal used for delivery of the original payload during a masking period repeated at a preset cycle.

According to an embodiment, the transmitter may include: a transmission controller which transmits the original payload based on the internal clock signal, and generates a first transmission request signal in the second mode; a data transmitter which generates the internal clock signal, and transmits the clock training pattern and the first payload to the first line and the second line; an encoder which encodes the original payload provided from the transmission controller into the first payload, and transmits the clock training pattern to the data transmitter in response to the first transmission request signal; a clock counter which counts the internal clock signal, and generates a clock control signal in response to a preset count value; and a clock controller which masks some of the internal clock signal based on the clock control signal, and provides a modified clock signal modified by the masking to the transmission controller and the encoder.

According to an embodiment, the internal clock signal may be output at a gate-off level during a masking period repeated at a preset cycle.

According to an embodiment, an input of the original payload to the encoder may be held during a masking period repeated at a preset cycle.

According to an embodiment, the transmission controller may transmit the original payload to the encoder in synchronization with a gate-on level of the modified clock signal, and the encoder may receive the original payload in synchronization with the gate-on level of the modified clock signal.

According to an embodiment, the encoder may output the first payload to the data transmitter in synchronization with the gate-on level of the internal clock signal.

According to an embodiment, in the second mode, the encoder may further generate a start pattern transmitted between the clock training pattern and the first payload, and may further generate an end pattern transmitted after the first payload.

According to an embodiment, the data transmitter may sequentially transmit an HS-zero pattern and an HS-sync pattern before transmitting the clock training pattern, and may sequentially transmit an HS-trail pattern and an HS-exit pattern after transmitting the end pattern.

According to an embodiment, the encoder may provide a first transmission preparation signal to the transmission controller, and the data transmitter may provide a second transmission preparation signal to the encoder.

According to an embodiment, the first transmission request signal maybe activated and the first and second transmission preparation signals may be deactivated in a first period, and the encoder may transmit the clock training pattern to the data transmitter in the first period.

According to an embodiment, the second transmission preparation signal may be activated and the first transmission preparation signal may be deactivated in a second period, and the data transmitter may transmit the clock training pattern to the first line and the second line in the second period.

In accordance with an embodiment of the disclosure, a driving method of a transceiver including a transmitter and a receiver connected to each other by a first line and a second line includes transmitting signals having a first voltage range from a transmitter to a receiver in a first mode; and transmitting signals having a second voltage range smaller than the first voltage range from the transmitter to the receiver in a second mode. In such an embodiment, the transmitting the signals having the second voltage range includes: transmitting a clock training pattern from the transmitter to the receiver through the first line and the second line; and generating a first payload by encoding an original payload in an encoder included in the transmitter and transmitting the first payload from the transmitter to the receiver through the first line and the second line.

According to an embodiment, the first line and the second line may be used in a single-ended manner in the first mode, and the first line and the second line may be used in a differential manner in the second mode.

According to an embodiment, the transmitting the first payload may include: counting the internal clock signal of the transmitter to mask some of the internal clock signal; inputting the original payload to the encoder based on the modified clock signal by the masking; encoding the original payload into the first payload using an encoding key; and outputting the first payload from the encoder based on the internal clock signal.

According to an embodiment, the modified clock signal may be output at a gate-off level during a masking period repeated at a preset cycle.

According to an embodiment, the input of the original payload to the encoder may be held during the masking period.

According to an embodiment, the encoding the original payload may include generating a start pattern transmitted between the clock training pattern and the first payload and an end pattern transmitted after the first payload.

In accordance with an embodiment of the disclosure, a display system includes: a processor which outputs image data; a display module which displays an image based on the image data; and a transceiver which transmits and receives data between the processor and the display module. In such an embodiment, the transceiver includes a transmitter and a receiver connected to each other by a first line and a second line. In an embodiment, the transmitter transmits signals having a first voltage range to the first line and the second line in a first mode, and transmits signals having a second voltage range smaller than the first voltage range to the first line and the second line in a second mode. In such an embodiment, the transmitter encodes an original payload in the second mode to generate a first payload, and transmits a clock training pattern and the first payload through the first line and the second line. In such an embodiment, the transmitter masks the internal clock signal used for delivery of the original payload during a masking period which is repeated at a preset cycle.

In embodiments of the transceiver and the driving method of the transceiver, the transceiver may perform data communication through data including clock information using an MIPI protocol without a clock line. Accordingly, the additional space and cost for a clock line may be reduced, and power consumption may also be reduced.

In such embodiments, the transmitter may cyclically mask the internal clock signal to prevent or minimize a data communication error due to a difference in data input/output processing time of for a same valid data in the encoder due to a data overhead. Accordingly, a data input processing frequency and a data output processing frequency of the encoder may be substantially the same as each other, and integrity of data transmission/reception may be maintained.

In such embodiments, by substantially synchronizing the data input processing frequency and the data output processing frequency of the encoder only by masking the internal clock signal without an additional generation of a clock signal or a memory for the integrity of data transmission/reception, circuit complexity may be reduced, and the cost may be reduced.

DETAILED DESCRIPTION

Figure 1:
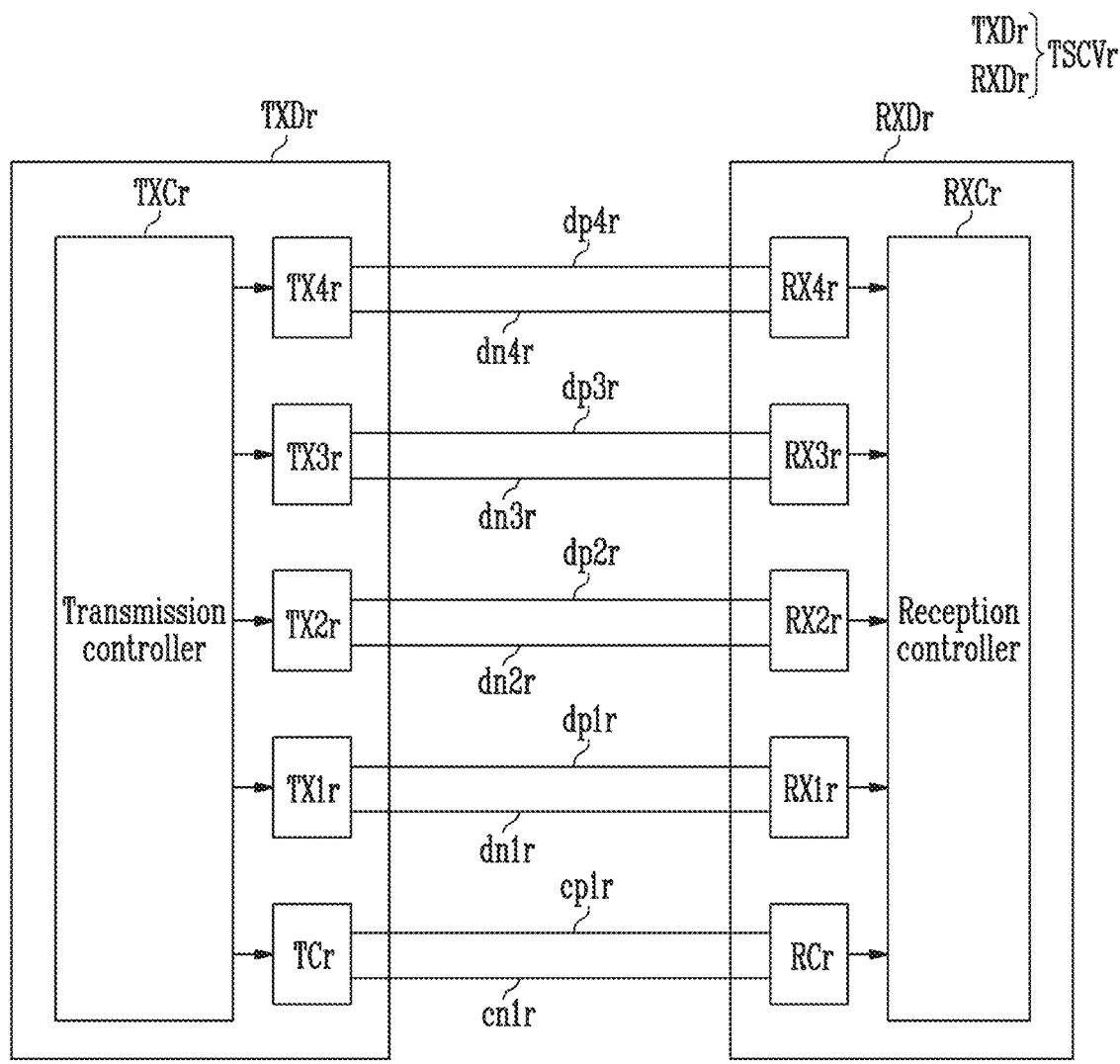
FIGS. 1 and 2 are drawings illustrating embodiments of a transceiver.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In order to clearly illustrate embodiments of the invention, parts that are not related to the description are omitted, and the same or similar constituent elements are given the same reference numerals throughout the specification.

Therefore, the above-mentioned reference numerals can be used in other drawings.

In addition, since the size and thickness of each configuration shown in the drawing are arbitrarily shown for better understanding and ease of description, the invention is not necessarily limited to the illustrated one. In the drawings, the dimensions of layers and regions are exaggerated for clarity of illustration.

In addition, the expression "the same" in the description may mean "substantially the same". That is, it may be the same degree to which a person with ordinary knowledge can convince as the same. Other expressions may be expressions in which "substantially" is omitted.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Hereinafter, embodiments of the invention will be described in detail with reference to the accompanying drawings.

Figure 2:
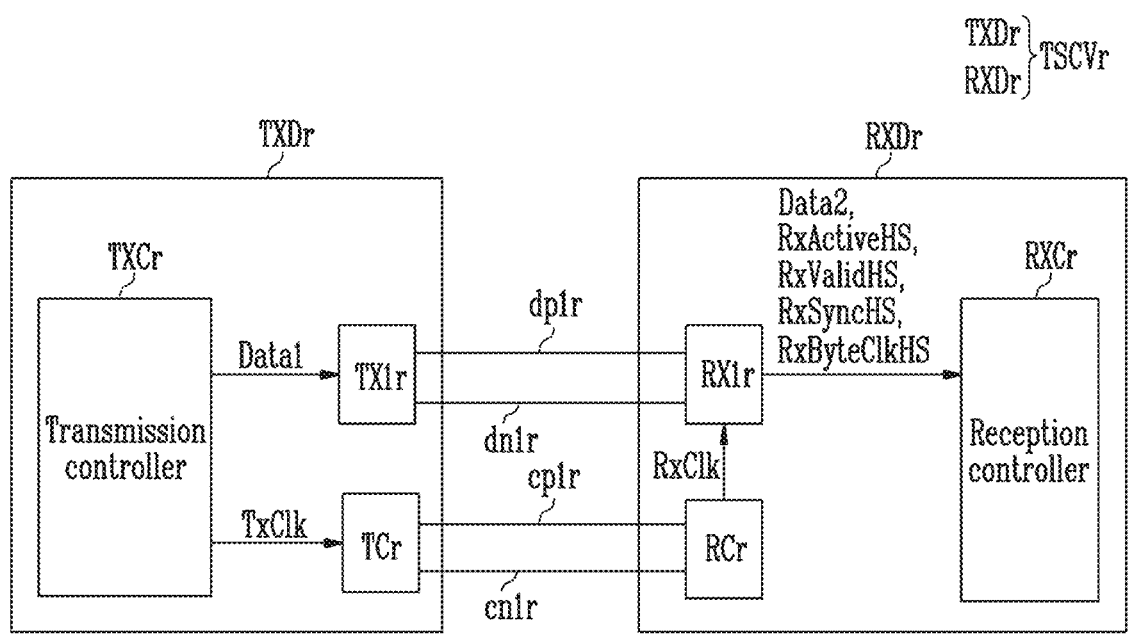

FIGS. 1 and 2 are drawings illustrating embodiments of a transceiver.

Referring to FIGS. 1 and 2, an embodiment of a transceiver TSCVr may include a transmitter TXDr and a receiver RXDr.

In an embodiment, as shown in FIG. 1, the transmitter TXDr may include a transmission controller TXCr, a plurality of data transmitters TX1r, TX2r, TX3r, and TX4r, and a clock transmitter TCr. The receiver RXDr may include a reception controller RXCr, a plurality of data receivers RX1r, RX2r, RX3r, and RX4r, and a clock receiver RCr.

A first data transmitter TX1r may be connected to a first data receiver RX1r through a first line dp1r (or a first data lane) and a second line dn1r (or a second data lane). The first data transmitter TX1r and the first data receiver RX1r may be referred to as a first data channel. A second data transmitter TX2r may be connected to a second data receiver RX2r through the first line dp2r and the second line dn2r. The second data transmitter TX2r and the second data receiver RX2r may be referred to as a second data channel. A third data transmitter TX3r may be connected to a third data receiver RX3r through the first line dp3r and the second line dn3r. The third data transmitter TX3r and the third data receiver RX3r may be referred to as a third data channel. A fourth data transmitter TX4r may be connected to a fourth data receiver RX4r through the first line dp4r and the second line dn4r. The fourth data transmitter TX4r and the fourth data receiver RX4r may be referred to as a fourth data channel.

The clock transmitter TCr may be connected to the clock receiver RCr through a first clock line cp1r (or a first clock lane) and a second clock line cn1r (or a second clock lane). The clock transmitter TCr and the clock receiver RCr may be referred to as a clock channel.

The data transmitters TX1r, TX2r, TX3r, and TX4r, the clock transmitter TCr, the data receivers RX1r, RX2r, RX3r, RX4r, and the clock receiver RCr may correspond to a physical layer and a datalink layer of an OSI 7 layer model, may correspond to a network interface of a TCP/IP protocol, or may correspond to a physical layer of a mobile industry processor interface ("MIPI") protocol. The physical layer of the MIPI protocol may be configured according to various predetermined specifications, such as D-PHY, C-PHY, and M-PHY. Hereinafter, for ease of description, embodiments in which the plurality of data transmitters TX1r, TX2r, TX3r, and TX4r, the clock transmitter TCr, the plurality of data receivers RX1r, RX2r, RX3r, and RX4r, and the clock receiver RCr are configured according to the D-PHY specification among the physical layers of the MIPI protocol, will be described in detail.

In an embodiment, the transmission controller TXCr and the reception controller RXCr may correspond to a network layer and a transport layer of the OSI 7 layer model, may correspond to an internet and a transport of the TCP/IP protocol, or may correspond to a protocol layer of the MIPI protocol. The protocol layer of the MIPI protocol may be configured according to various predetermined specifications, such as display serial interface ("DSI") and camera serial interface ("CSI"). Hereinafter, for ease of description, embodiments in which the transmission controller TXCr and the reception controller RXCr are configured according to the DSI specification among the protocol layers of the MIPI protocol, will be described in detail.

In an embodiment, the transmission controller TXCr, the data transmitters TX1r, TX2r, TX3r, and TX4r, and the clock transmitter TCr may be configured separately from each other in hardware, or at least two or more thereof may be integrated in hardware. In an alternative embodiment, the transmission controller TXCr, the data transmitters TX1r, TX2r, TX3r, TX4r, and the clock transmitter TCr may be configured separately from each other in software, or at least two or more thereof may be integrated in software.

According to an embodiment, the transmitter TXDr may be configured as a part (i.e., hardware or software) of another control unit (e.g., an application processor ("AP"), a graphics processing unit ("GPU"), a central processing unit ("CPU"), or the like), or may be configured as independent hardware (e.g., a transmission dedicated integrated circuit ("IC")).

The reception controller RXCr, the data receivers RX1r, RX2r, RX3r, RX4r, and the clock receiver RCr may be configured separated from each other in hardware, or at least two or more thereof may be integrated in hardware. The reception controller RXCr, the data receivers RX1r, RX2r, RX3r, RX4r, and the clock receiver RCr may be configured separately from each other in software, or at least two or more thereof may be integrated in software.

According to an embodiment, the receiver RXDr may be a part (i.e., hardware or software) of another control unit (e.g., a timing controller ("TCON"), a TCON embedded driver IC ("TED"), a driver IC ("D-IC"), or the like included in the display device), or may be configured as independent hardware (e.g., a reception dedicated IC).

In an embodiment, as shown in FIG. 1, the transceiver TSCVr may include four data channels, and the four data channels may transmit and receive data independent of each other. The four data channels may share a clock signal provided to one clock channel.

In an embodiment, as shown in FIG. 2, a transceiver TSCVr including one data channel, which is the minimum number, may be provided. In one embodiment, for example, the transmitter TXDr may include one first data transmitter TX1r, and the receiver RXDr may include one first data receiver RX1r.

The transmission controller TXCr may provide first data Data1 to the first data transmitter TX1r, and may provide a transmission clock signal TxClk to the clock transmitter TCr.

The first data transmitter TX1r may transmit the first data Data1 through the first line dp1r and the second line dn1r. In such an embodiment, the first data transmitter TX1r may transmit other data before and after (or prior to and subsequent to) the first data Data1 according to a predetermined protocol.

The clock transmitter TCr may transmit the transmission clock signal TxClk through the first clock line cp1r and the second clock line cn1r.

The clock receiver RCr may provide a reception clock signal RxClk received through the first clock line cp1r and the second clock line cn1r to the first data receiver RX1r.

The first data receiver RX1r may sample data received through the first line dp1r and the second line dn1r based on the reception clock signal RxClk. The first data receiver RX1r may provide the second data Data2 including the same payload as the first data Data1 to the reception controller RXCr. In such an embodiment, the first data receiver RX1r may provide a plurality of control signals RxActiveHS, RxValidHS, RxSyncHS, and RxByteClkHS used according to the protocol to the reception controller RXCr.

Figure 3:
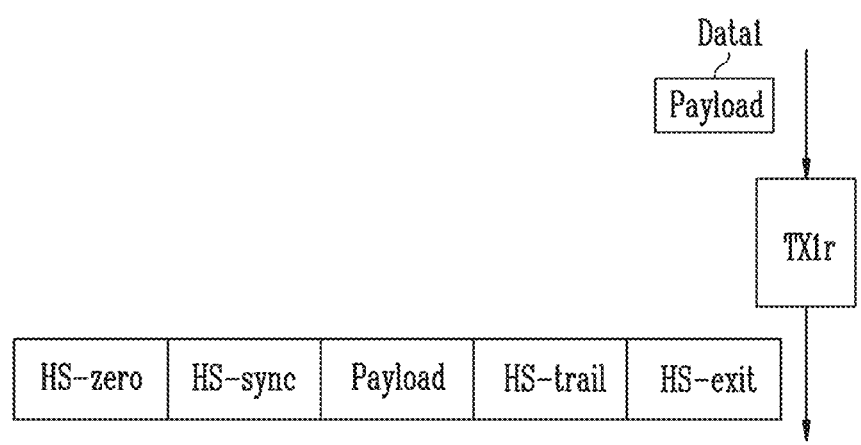
FIGS. 3 and 4 are drawings illustrating an embodiment of an operation of a transmitter included in the transceiver of FIGS. 1 and 2.
Figure 4:
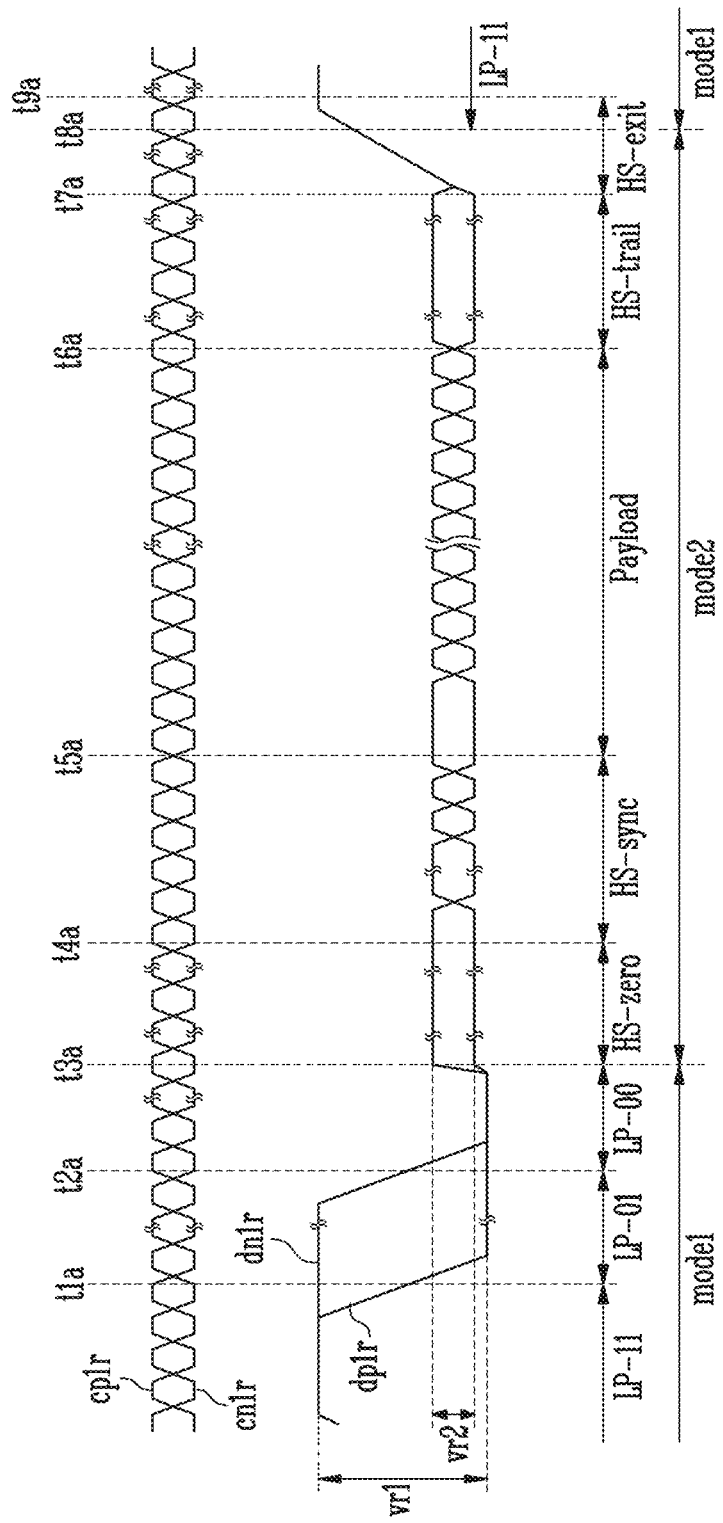

FIGS. 3 and 4 are drawings illustrating an embodiment of an operation of a transmitter included in the transceiver of FIGS. 1 and 2.

Referring to FIGS. 1, 3, and 4, the transmitter (e.g., the first data transmitter TX1r) may add other data before and after (or prior to and subsequent to) the payload according to a predetermined protocol to transmit data.

As shown in FIG. 3, the first data transmitter TX1r may receive the first data Data1 including a payload Payload. The first data Data1 may include image information and the like. In an embodiment, the first data transmitter TX1r may sequentially transmit a first pattern HS-zero, a second pattern HS-sync, a payload Payload, a third pattern HS-trail, and a fourth pattern HS-exit based on the MIPI protocol.

In an embodiment, as shown in FIG. 4, the transmitter TXDr (e.g., the first data transmitter TX1r) may transmit signals having a first voltage range vr1 the first line dp1r and the second line dn1r in the first mode mode1. In one embodiment, the transmitter TXDr may transmit signals having a second voltage range vr2 smaller than the first voltage range vr1 to the first line dp1r and the second line dn1r in the second mode mode2.

In one embodiment, for example, an upper limit of the first voltage range vr1 may be greater than an upper limit of the second voltage range vr2, and a lower limit of the first voltage range vr1 may be smaller than or equal to a lower limit of the second voltage range vr2. In an embodiment where the MIPI protocol is applied to the transceiver TSCVr, the first mode mode1 may be a low power ("LP") mode, and the second mode mode2 may be a high speed ("HS") mode.

In the first mode mode1, the first line dp1r and the second line dn1r may be used independently of each other in a single-ended manner or may each operate based on a single-ended signaling. That is, signals transmitted to each of the first line dp1r and the second line dn1r in the first mode mode1 may be the same as or different from each other. In one embodiment, for example, the combination of the first line dp1r and the second line dn1r in the first mode mode1 may have one of four states. (e.g., dp1r high & dn1r high, dp1r high & dn1r low, dp1r low & dn1r high, dp1r low & dn1r low)

In the second mode mode2, the first line dp1r and the second line dn1r may be used in a differential manner or may operate based on a differential signaling. That is, signals transmitted to each of the first line dp1r and the second line dn1r in the second mode mode2 may be different from each other. Accordingly, the combination of the first line dp1r and the second line dn1r in the second mode mode2 may have one of two states. (e.g., dp1r high & dn1r low, dp1r low & dn1r high)

In an embodiment, the transmitter TXDr may transmit predetermined patterns (e.g., pattern LP-11, pattern LP-01, and pattern LP-00) to the first line dp1r and the second line dn1r to indicate a transition from the first mode mode1 to the second mode mode2. In one embodiment, for example, the transmitter TXDr may maintain the signals applied to the first line dp1r and the second line dn1r before the first time point t1a at a logic high level (i.e., the pattern LP-11). When a voltage level of the supplied signal is greater than the predetermined first threshold voltage level, a transmitted signal may be determined to be a logic high level. When a voltage level of the supplied signal is smaller than the predetermined second threshold voltage level, a transmitted signal may be determined to be a logic low level.

Thereafter, the transmitter TXDr may change the signal of the first line dp1r to the logic low level at a first time point t1a, and may maintain the signal of the second line dn1r at the logic high level (i.e., the pattern LP-01).

The transmitter TXDr may maintain the signal of the first line dp1r at the logic low level at a second time point t2a, and may change the signal of the second line dn1r to the logic low level (i.e., the pattern LP-00). The data transmission in the first mode mode1 may be terminated through the patterns LP-11, LP-01, and LP-00, and the transceiver TSCVr may indicate that it is a transient state to be converted from the first mode mode1 to the second mode mode2.

The transmitter TXDr may transmit sequentially the first pattern HS-zero, the second pattern HS-sync, the payload Payload, the third pattern HS-trail, and the fourth pattern HS-exit to the receiver RXDr in the second mode mode2. In one embodiment, for example, the transmitter TXDr may transmit the first pattern HS-zero during a period from a third time point t3a to a fourth time point t4a, may transmit the second pattern HS-sync during a period from the fourth time point t4a to a fifth time point t5a, may transmit the payload Payload during a period from the fifth time point t5a to a sixth time point t6a, may transmit the third pattern HS-trail during a period from the sixth time point t6a to a seventh time point t7a, and may transmit the fourth pattern HS-exit after the seventh time point t7a. Each of the first to fourth patterns HS-zero, HS-sync, HS-trail, and HS-exit may be a digital data pattern.

The first pattern HS-zero may be a pattern for indicating a waiting section after entering from the first mode mode1 to the second mode mode2. In one embodiment, for example, the first pattern HS-zero may be a pattern in which zeros (0) are repeated.

The second pattern HS-sync may be a pattern for indicating the start of transmission of the payload Payload. In one embodiment, for example, the second pattern HS-sync may have a value of OxB8h or a value of 00011101.

The payload Payload may be effective data to be transmitted. Accordingly, the payload Payload may include variable values rather than a predetermined pattern. In one embodiment, for example, the payload Payload may include the image data.

The third pattern HS-trail may be a pattern for indicating the end of transmission of the payload Payload. The third pattern HS-trail may be a pattern in which a value opposite to the last data of the payload Payload is repeated. In one embodiment, for example, when the last data (bit) of the payload Payload is 0, the third pattern HS-trail may be a pattern in which 1 is repeated. Alternatively, when the last data (bit) of the payload Payload is 1, the third pattern HS-trail may be a pattern in which 0 is repeated.

The fourth pattern HS-exit may be a pattern for indicating that the second mode mode2 ends and the first mode mode1 starts. The fourth pattern HS-exit may not be composed of a specific bit, but may be a transitional pattern in which a voltage increases to exceed the second voltage range vr2.

The transmitter TXDr may change the signals applied to the first line dp1r and the second line dn1r during period from an eighth time point t8a to a ninth time point t9a to the logic high level (i.e., the pattern LP-11). Accordingly, the transmitter TXDr may indicate that the second mode mode2 ends and the first mode mode1 starts.

The transmitter TXDr (particularly, the clock transmitter TCr) may transmit the transmission clock signal TxClk to the clock receiver RCr of the receiver RXDr in differential mode through the first clock line cp1r and the second clock line cn1r in the first mode mode1 and the second mode mode2. The first data receiver RX1r may sample data received in the second mode mode2 based on the reception clock signal RxClk (refer to FIG. 2).

Figure 5:
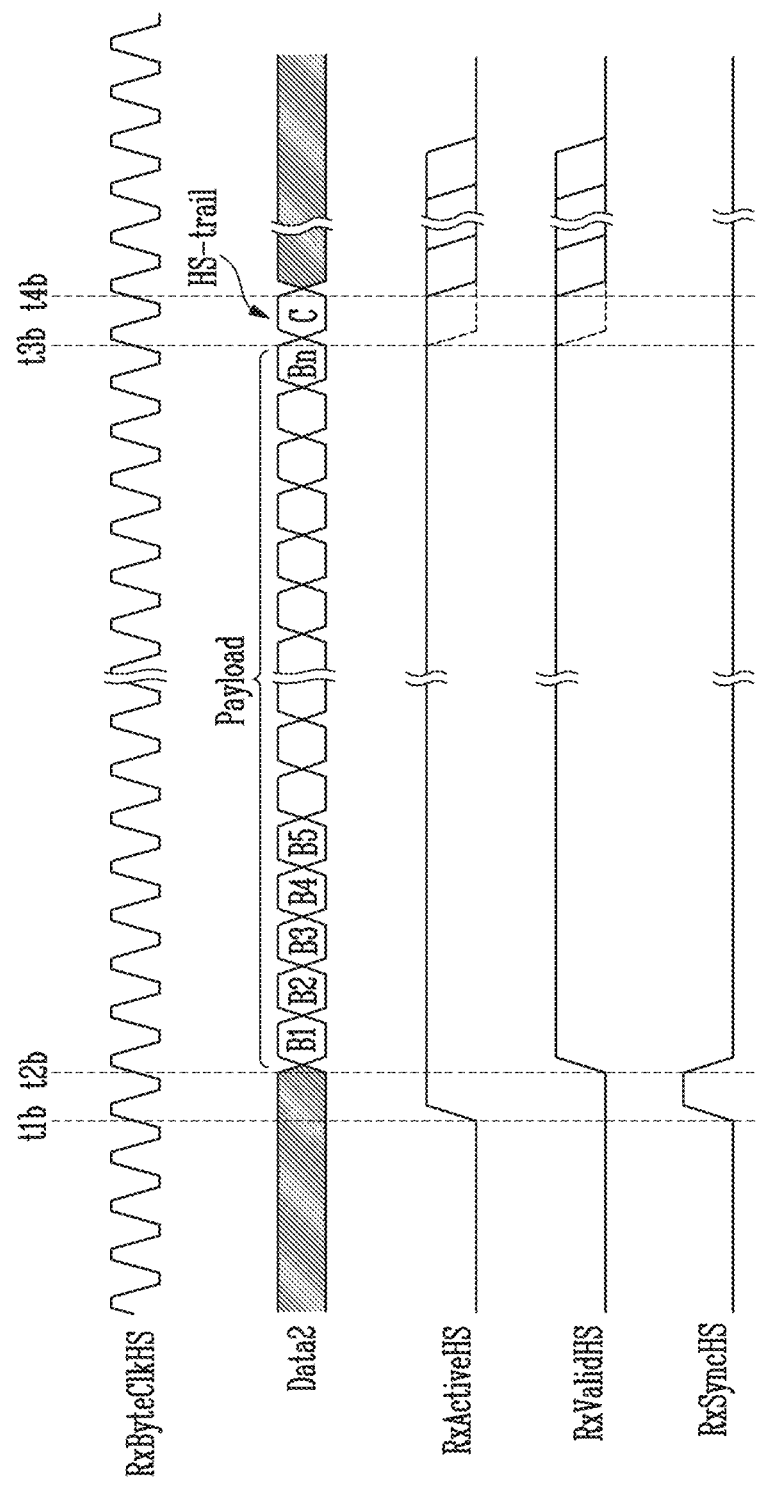
FIG. 5 is a drawing illustrating an embodiment of an operation of a receiver included in the transceiver of FIGS. 1 and 2.

FIG. 5 is a drawing illustrating an embodiment of an operation of a receiver included in the transceiver of FIGS. 1 and 2.

Referring to FIGS. 1 and 5, the receiver RXDr (e.g., the first data receiver RX1r) may generate second data Data2 and signals RxActiveHS, RxValidHS, RxSyncHS, and RxByteClkHS according to a preset communication protocol (e.g., the MIPI protocol).

The clock signal RxByteClkHS may be a high-speed transmission byte clock signal for indicating a data transmission unit of a byte unit. In one embodiment, for example, the high-speed transmission byte clock signal may indicate that one byte of the second data Data2 is transmitted every one cycle of the clock signal RxByteClkHS.

The second data Data2 may include a payload Payload composed of byte units B1, B2, B3, B4, B5, . . . , Bn and additional information C. In one embodiment, for example, the additional information C may correspond to the third pattern HS-trail from a third time point t3b to a fourth time point t4b. In one embodiment, for example, the additional information C may be 8-bit information in which 0 is repeated or 1 is repeated.

In one embodiment, for example, the first data receiver RX1r may parallelize the sampled payload Payload and the third pattern HS-trail through a deserializer (e.g., parallelize to 8 lines), and may transmit parallelized second data Data2 to the reception controller RXCr.

The logic level of the first reception control signal RxActiveHS may be changed from a first level (e.g., a logic low level) to a second level (e.g., a logic high level) at a first time point t1b. The first time point t1b may correspond to a time point before one cycle of the clock signal RxByteClkHS from the second time point t2b when the transmission of the second data Data2 starts. The first data receiver RX1r may determine the first time point t1b based on the fifth time point (shown as t5a in FIG. 4) at which the second pattern HS-sync ends.

The logic level of the second reception control signal RxValidHS may be changed from the first level to the second level at the second time point t2b. At a second time point t2b, the output of the first data B1 of the payload Payload of the second data Data2 may start. The second time point t2b may be a time point after one cycle of the clock signal RxByteClkHS from the first time point t1b.

In the third reception control signal RxSyncHS, the logic level may be changed from the first level to the second level at the first time point t1b, and the logic level may be changed from the second level to the first level at the second time point t2b. The third reception control signal RxSyncHS may define a transition interval between the first reception control signal RxActiveHS and the second reception control signal RxValidHS, and an output and function thereof may be determined according to the MIPI protocol.

Figure 6A:
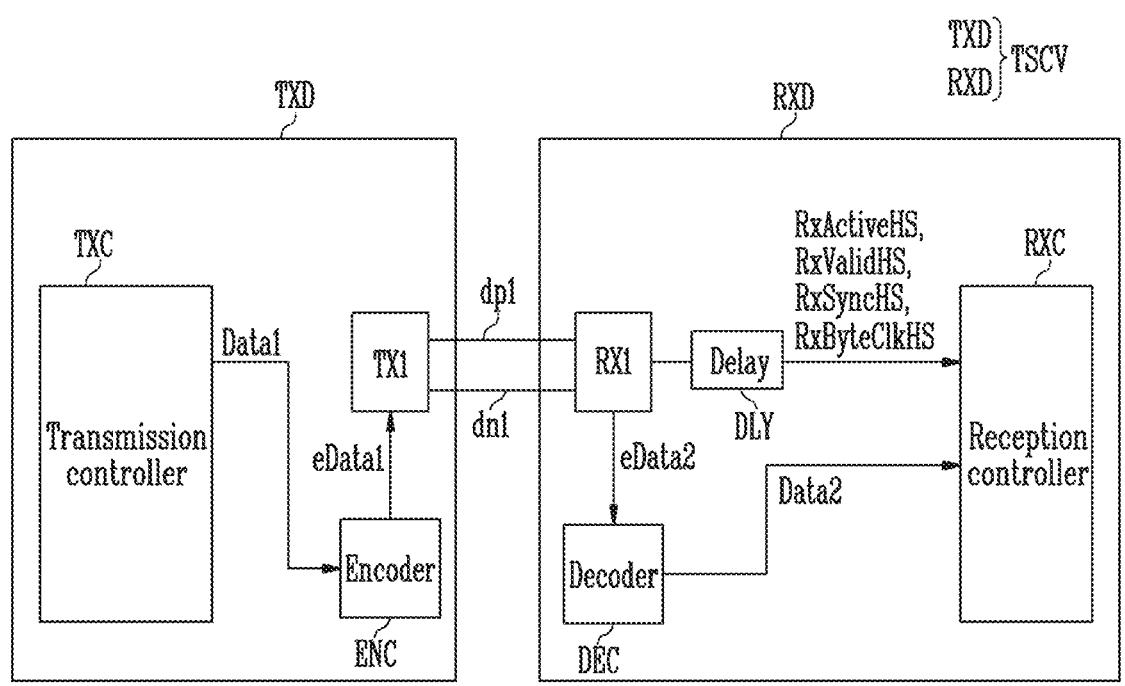
FIGS. 6A and 6B are drawings illustrating a transceiver according to embodiments of the invention.
Figure 6B:
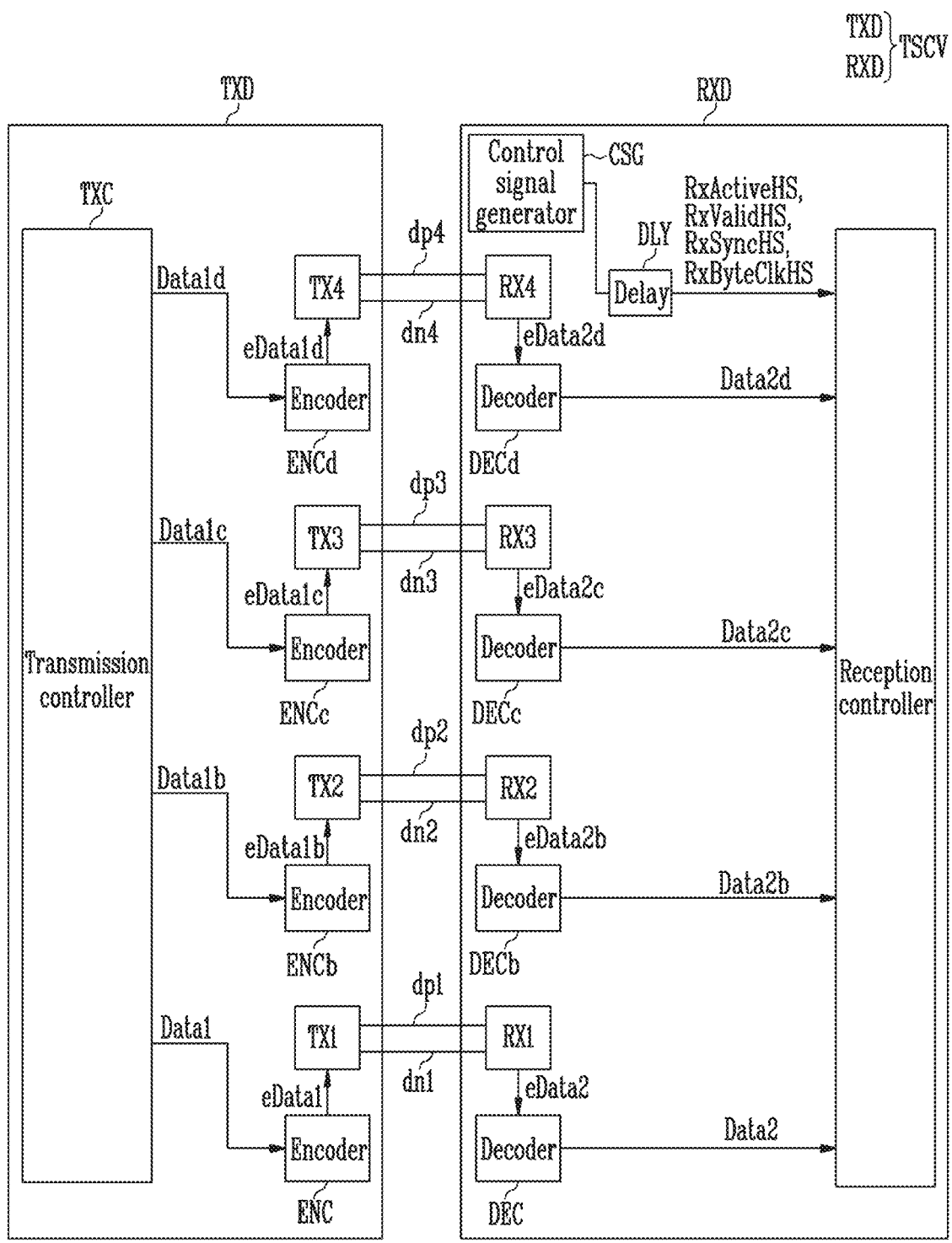

FIGS. 6A and 6B are drawings illustrating a transceiver according to embodiments of the invention.

The transceiver TSCV of FIGS. 6A and 6B may include substantially the same or similar configuration as the transceiver TSCVr of FIGS. 1 and 2, except that the clock transmitter TCr, the clock receiver RCr, and the clock lines cp1r and cn1r are removed, and the encoder ENC, the decoder DEC, and the delay DLY is added. Hereinafter, the differences between the transceiver TSCV of FIGS. 6A and 6B and the transceiver TSCVr of FIGS. 1 and 2 will be mainly described, and any repetitive detailed descriptions of the same or like elements will be omitted.

Referring to FIGS. 6A and 6B, an embodiment of the transceiver TSCV may include a transmitter TXD and a receiver RXD.

The transmitter TXD may include a transmission controller TXC (e.g., a transmission link module), a first data transmitter TX1 (e.g., a transmission D-PHY module), and an encoder ENC. The receiver RXD may include a reception controller RXC (e.g., a reception link module), a first data receiver RX1 (e.g., a reception D-PHY module), and a decoder DEC.

The first data transmitter TX1 may be connected to the first data receiver RX1 through the first line dp1 and the second line dn1. The first data transmitter TX1 and the first data receiver RX1 may be referred to as a first data channel. Hereinafter, for ease of description, embodiments in which the first data transmitter TX1 and the first data receiver RX1 are configured according to the D-PHY specification among the physical layers of the MIPI protocol, and the transmission controller TXC and the reception controller RXC are configured according to the DSI specification among the protocol layer of the MIPI protocol, will be described in detail. However, the first data transmitter TX1, the first data receiver RX1, the transmission controller TXC, and the reception controller RXC are not limited thereto, and may be applied to interfaces of various standards.

In an embodiment, the transmission controller TXC, the first data transmitter TX1, and the encoder ENC may be configured separately from each other in hardware, or two or more thereof may be integrated in hardware. In an embodiment, the transmission controller TXC, the first data transmitter TX1, and the encoder ENC may be configured separately from each other in software, or two or more thereof may be integrated in software. In an embodiment, the transmitter TXD may be configured as a part (i.e., hardware or software) of a predetermined processing unit (e.g., an AP, a GPU, a CPU, or the like), or may be configured as independent hardware (e.g., a transmission dedicated IC).

In an embodiment, the reception controller RXC, the first data receiver RX1, the decoder DEC, and the delay DLY may be configured separately from each other in hardware, or two or more thereof may be integrated in hardware. In an embodiment, the reception controller RXC, the first data receiver RX1, the decoder DEC, and the delay DLY may be configured separately from each other in software, or two or more thereof may be integrated in software. In an embodiment, the receiver RXD may be configured as a part (i.e., hardware or software) of a predetermined device (e.g., a TCON, a TED, a D-IC, or the like), or may be configured as independent hardware (e.g., a reception dedicated IC).

The transmission controller TXC may provide the first data Data1 including the original payload Payload to the encoder ENC. The encoder ENC may encode the first data Data1 to generate first encoded data eData1 including a first payload ePayload (or encoded payload), and may provide the first encoded data eData1 to the first data transmitter TX1. The first data transmitter TX1 may add other data before and after (or prior to and subsequent to) the first encoded data eData1 according to a predetermined protocol to transmit the added other data.

The first data receiver RX1 may generate a clock signal RxByteClkHS using the first encoded data eData1, and may sample data received through the first line dp1 and the second line dn1 based on the generated clock signal RxByteClkHS. In one embodiment, for example, the first data receiver RX1 may include a clock data recovery circuit.

The first data receiver RX1 may provide second encoded data eData2 including the first payload substantially the same as the first encoded data eData1 to the decoder DEC.

The decoder DEC may decode the second encoded data eData2 to generate second data Data2 including the same payload as the first data Data1, and may provide the second data Data2 the reception controller RXC.

In an embodiment, the first data receiver RX1 may generate a plurality of signals RxActiveHS, RxValidHS, RxSyncHS, and RxByteClkHS used according to a communication protocol applied to the transceiver TSCV. In such an embodiment, the delay DLY may delay the signals RxActiveHS, RxValidHS, RxSyncHS, and RxByteClkHS by a decoding time to provide them to the reception controller RXC. The decoding time may be a time for the decoder DEC to decode the second encoded data eData2 to generate the second data Data2.

According to an embodiment, as shown in FIG. 6A, the transceiver TSCV may include a single data channel, but not being limited thereto. Alternatively, the transceiver TSCV may include a plurality of data channels (e.g., four data channels) as shown in FIG. 6B.

In an embodiment, as shown in FIG. 6B, the transmitter TXD may further include second to fourth data transmitters TX2, TX3, and TX4 and corresponding encoders ENCb, ENCc, and ENCd. The receiver RXD may include second to fourth data receivers RX2, RX3, and RX4 and corresponding decoders DECb, DECc, and DECd. In such an embodiment, the receiver RXD may further include a control signal generator CSG and a delay DLY.

The second data transmitter TX2 may be connected to the second data receiver RX2 through the first line dp2 and the second line dn2. The second data transmitter TX2 and the second data receiver RX2 may be referred to as a second data channel. The third data transmitter TX3 may be connected to the third data receiver RX3 through the first line dp3 and the second line dn3. The third data transmitter TX3 and the third data receiver RX3 may be referred to as a third data channel. The fourth data transmitter TX4 may be connected to the fourth data receiver RX4 through the first line dp4 and the second line dn4. The fourth data transmitter TX4 and the fourth data receiver RX4 may be referred to as a fourth data channel. The plurality of data channels may transmit and receive data independently of each other.

In such an embodiment, since the operations of the encoders ENCb, ENCc, and ENCd to encode the data Data1$b$, Data1$c$, and Data1$d$ to generate the encoded data eData1$b$, eData1$c$, and eData1$d$ is substantially the same as those of the encoder ENC described above, any repetitive detailed descriptions thereof will be omitted.

In such an embodiment, since the operations of the decoders DECb, DECc, and DECd to decode the encoded data eData2$b$, eData2$c$, and eData2$d$ to generate the data Data2$b$, Data2$c$, and Data2$d$ is substantially the same as those of the decoder DEC described above, any repetitive detailed description thereof will be omitted.

The control signal generator CSG may generate control signals RxActiveHS, RxValidHS, and RxSyncHS and a clock signal RxByteClkHS based on the data received by the first to fourth data receivers RX1, RX2, RX3, and RX4. In one embodiment, for example, the control signal generator CSG may align timings of data received by the second to fourth data receivers RX2, RX3, and RX4, and may generate control signals RxActiveHS, RxValidHS, and RxSyncHS and a clock signal RxByteClkHS based on the aligned data.

The delay DLY may delay at least one selected from the control signals RxActiveHS, RxValidHS, and RxSyncHS and the clock signal RxByteClkHS by a decoding time to provide it to the reception controller RXC. Here, the decoding time may be a time used for the decoders DEC, DECb, DECc, an DECd to decode the second encoded data eData2, eData2$b$, eData2$c$, and eData2$d$ to generate the second data Data2, Data2$b$, Data2$c$, and Data2$d$. In one embodiment, for example, where the decoding times of the decoders DEC, DECb, DECc, and DECd are different from each other, the delay DLY may delay at least one output of the control signals RxActiveHS, RxValidHS, and RxSyncHS and the clock signal RxByteClkHS based on the longest decoding time among the decoding times of the decoders DEC, DECb, DECc, and DECd.

In such an embodiment, the clock line connected between the transmitter TXD and the receiver RXD in the transceiver TSCV for communication based on the MIPI protocol may be omitted (removed). In such an embodiment, clock information (or information of the clock signal) may be included (built-in) in encoded data (e.g., eData1, eData1$b$, eData1$c$, and eData1$d$) supplied to the first and second lines dp1 and dn1. Accordingly, physical/spatial cost and power consumption due to arrangement of the clock line may be reduced.

Figure 7:
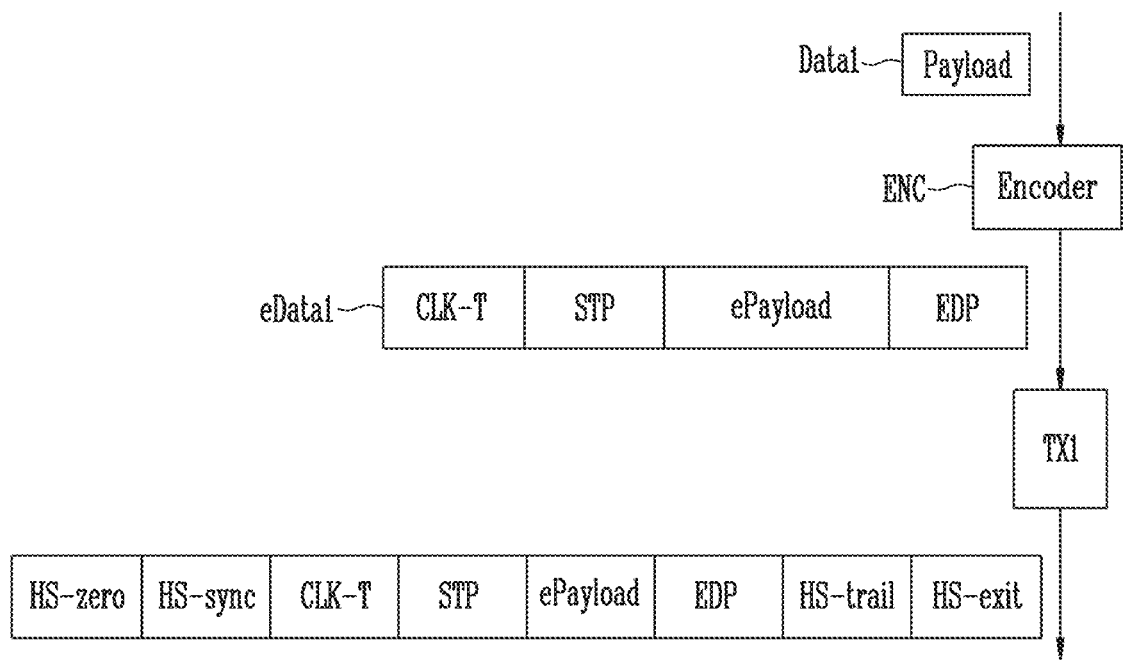
FIGS. 7 and 8 are drawings illustrating an embodiment of an operation of a transmitter included in the transceiver of FIGS. 6A and 6B.
Figure 8:
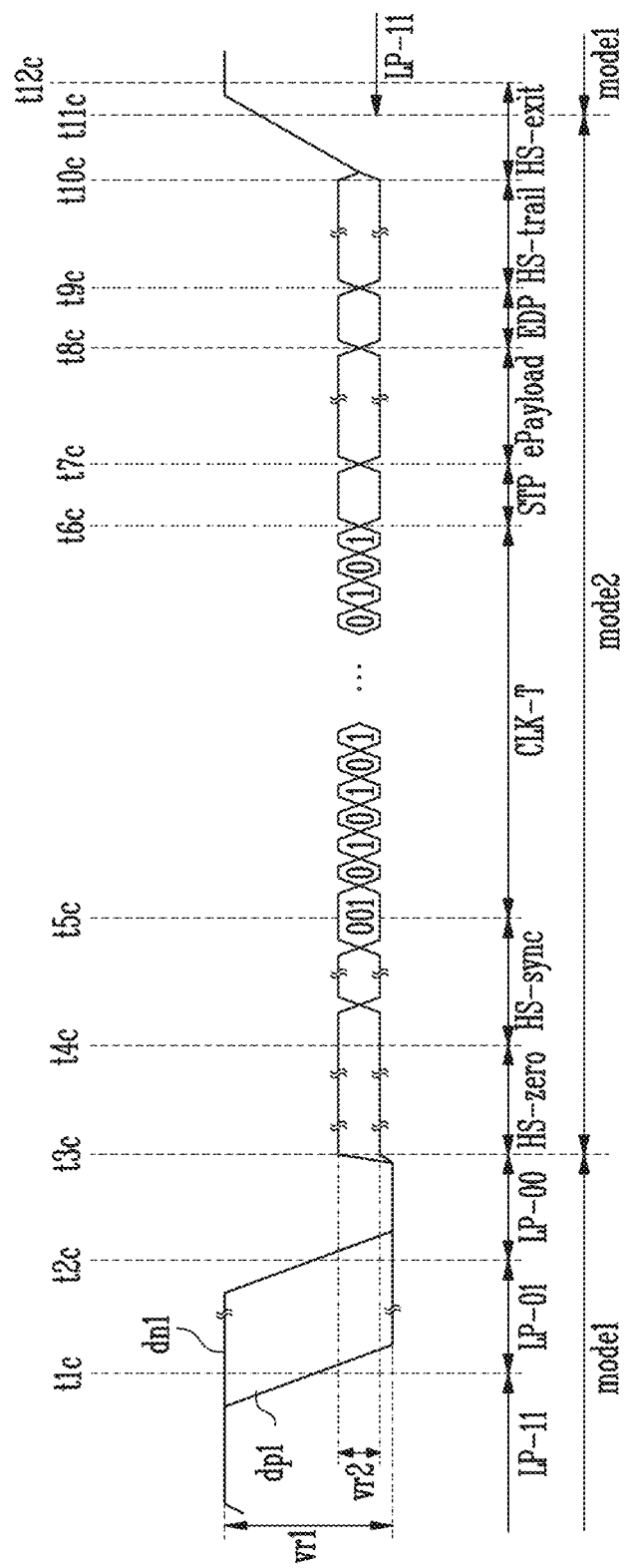

FIGS. 7 and 8 are drawings illustrating an embodiment of an operation of a transmitter included in the transceiver of FIGS. 6A and 6B.

Referring to FIGS. 6A, 6B, 7, and 8, an embodiment of the transmitter TXD may add other data before and after (or prior to and subsequent to) the payload Payload according to the predetermined protocol to transmit data through the first and second lines dp1 and dn1.

The encoder ENC may receive the first data Data1 including the original payload Payload. The encoder ENC may encode the original payload Payload to generate a first payload ePayload, and may add data before and after (or prior to and subsequent to) the first payload ePayload to generate the first encoded data eData1. In one embodiment, for example, the first encoded data eData1 may sequentially include a clock training pattern CLK-T, a start pattern STP, a first payload ePayload, and an end pattern EDP.

The clock training pattern CLK-T may include frequency information among clock information. The clock training pattern CLK-T may be data used to recover a clock signal in the receiver RXD. The receiver RXD may generate a clock signal having a specific frequency and a specific phase by using such clock information.

In one embodiment, for example, as shown in FIG. 8, the clock training pattern CLK-T may be a pattern in which one '1' and one '0' are repeated (e.g., 01010101 . . . ). The frequency and phase of the clock signal generated by the clock data recovery circuit of the receiver RXD may be undesirably changed by external factors (e.g., noise, temperature, etc.). The receiver RXD may correct the frequency and phase of the clock signal using the clock training pattern CLK-T.

In an embodiment, the clock training pattern CLK-T may repeatedly include a plurality of consecutive '0' and a plurality of consecutive '1'. In one embodiment, for example, the frequency information and phase information indicated by the clock training pattern CLK-T may vary according to the number of consecutive '0' or the number of consecutive '1'.

The start pattern STP may be a pattern for indicating the start of transmission of the first payload ePayload. The start pattern STP may be a pattern that the encoded first payload ePayload is not allowed to include (i.e., prohibited to use). In one embodiment, for example, the start pattern STP may be configured as 24b' (24 bits) 011100_000000_111111_110001'.

The first payload ePayload may include clock information. In one embodiment, for example, if there are many consecutive '0' or many consecutive '1' in the original payload Payload, a transition of a signal is small, so that a phase correction of the clock signal based on the clock training may not be sufficiently performed in the first data receiver RX1 and a skew of the clock signal may occur due to the clock training. Accordingly, the encoder ENC may encode the first payload ePayload so that there are sufficiently many transitions (changes from 0 to 1 or changes from 0 to 1) of the first payload ePayload compared to the original payload Payload. In an embodiment, the encoder ENC may encode the first payload ePayload to have bits of a specific rule cyclically.

The end pattern EDP may be a pattern indicating the end of transmission of the first payload ePayload. The end pattern EDP may be a pattern that the encoded first payload ePayload is not allowed to include (i.e., prohibited to use). In one embodiment, for example, the end pattern EDP may be configured as 24b' (24 bits) 011100_111111_000000_110001'.

The first data transmitter TX1 may receive the first encoded data eData1 including a first payload ePayload. The first data transmitter TX1 may add other data before and after (or prior to and subsequent to) the first encoded data eData1 according to the predetermined protocol to transmit the added other data. In one embodiment, for example, where the predetermined protocol is the MIPI protocol, the first data transmitter TX1 may sequentially transmit the first pattern HS-zero, the second pattern HS-sync, the first encoded data eData1, and the third pattern HS-trail, and the fourth pattern HS-exit.

In an embodiment, as shown in FIG. 8, the transmitter TXD (in particular, the first data transmitter TX1) may transmit signals having a first voltage range vr1 to the first line dp1 and the second lines dn1 in the first mode mode1. The transmitter TXD may transmit signals having a second voltage range vr2 smaller than the first voltage range vr1 to the first line dp1 and the second line dn1 in the second mode mode2.

In the first mode mode1, the first line dp1 and the second line dn1 may be used in a single-ended manner or may each operate based on a single-ended signaling. That is, signals transmitted to each of the first line dp1 and the second line dn1 in the first mode mode1 may be the same as or different from each other.

In the second mode mode2, the first line dp1 and the second line dn1 may be used in a differential manner or may operate based on a differential signaling. That is, signals transmitted to each of the first line dp1 and the second line dn1 in the second mode mode2 may be different from each other.

The transmitter TXD may transmit the clock training pattern CLK-T and the first payload ePayload in the second mode mode2.

In an embodiment, the transmitter TXD may transmit predetermined patterns (e.g., pattern LP-11, pattern LP-01, and pattern LP-00) to the first line dp1 and the second line dn1 to indicate a transition from the first mode mode1 to the second mode mode2.

In one embodiment, for example, the transmitter TXD may maintain the signals applied to the first line dp1 and the second line dn1 before a first time point t1c at a logic high level (i.e., the pattern LP-11).

The transmitter TXD may change the signal of the first line dp1 to the logic low level through the first time point t1c, and may maintain the signal of the second line dn1 at the logic high level (i.e., the pattern LP-01). Next, the transmitter TXD may maintain the signal of the first line dp1 at the logic low level through a second time point t2c, and may change the signal of the second line dn1 at the logic low level (i.e., the pattern LP-00).

Thereafter, in the second mode mode2, the transmitter TXD may sequentially transmit the first pattern HS-zero, the second pattern HS-sync, the first encoded data eData1, the third pattern HS-trail, and the fourth pattern HS-exit. In one embodiment, for example, the transmitter TXD may transmit the first pattern HS-zero during the period from a third time point t3c to a fourth time point t4c, may transmit the second pattern HS-sync during the period from the fourth time point t4c to a fifth time point t5c, and may transmit the clock training pattern CLK-T during the period from the fifth time point t5c to a sixth time point t6c.

In such an embodiment, the transmitter TXD may transmit the start pattern STP during the period from the sixth time point t6c to a seventh time point t7c, may transmit the first payload ePayload during the period from the seventh time point t7c to an eighth time point t8c, and may transmit the end pattern EDP during the period from the eighth time point t8c to a ninth time point t9c.

Thereafter, the transmitter TXD may transmit the third pattern HS-trail during the period of the ninth time point t9c to a tenth time point t10c, and may transmit the fourth pattern HS-exit after a period from the tenth time point t10c to an eleventh time point t120.

The first pattern HS-zero may be a pattern for indicating a waiting section after entering from the first mode mode1 to the second mode mode2. The second pattern HS-sync may be a pattern for indicating the start of transmission of the first encoded data eData1.

The third pattern HS-trail may be a pattern for indicating the end of transmission of the first encoded data eData1. The third pattern HS-trail may be a pattern in which a value opposite to the last data of the first encoded data eData1 is repeated.

The fourth pattern HS-exit may be a pattern for indicating that the second mode mode2 ends and the first mode mode1 starts. The fourth pattern HS-exit may not be composed of a specific bit, but may be a transitional pattern in which a voltage increases to exceed the second voltage range vr2.

The transmitter TXD may change the signals applied to the first line dp1 and the second line dn1 after the tenth time point t10c to a logic high level. In one embodiment, for example, the output of the pattern LP-11 may proceed from the eleventh time point t11c. Accordingly, the transmitter TXD may indicate that the second mode mode2 ends and the first mode mode1 starts.

The receiver RXD may generate a clock signal (e.g., a high-speed transmission byte clock signal, denoted as RxByteClkHS in FIG. 6A) using the clock training pattern CLK-T and the first payload ePayload. The first data receiver RX1 may include a clock data recovery circuit, and may generate a clock signal having a specific frequency and phase using the clock training pattern CLK-T.

In such an embodiment, the first data receiver RX1 may continuously correct the phase of the clock signal to prevent a skew of the clock signal by using the first payload ePayload. The first data receiver RX1 may sample the received data using the generated clock signal.

Accordingly, in such an embodiment of the invention, a transceiver TSCV may effectively communicate using the MIPI protocol without the clock line.

Figure 9:
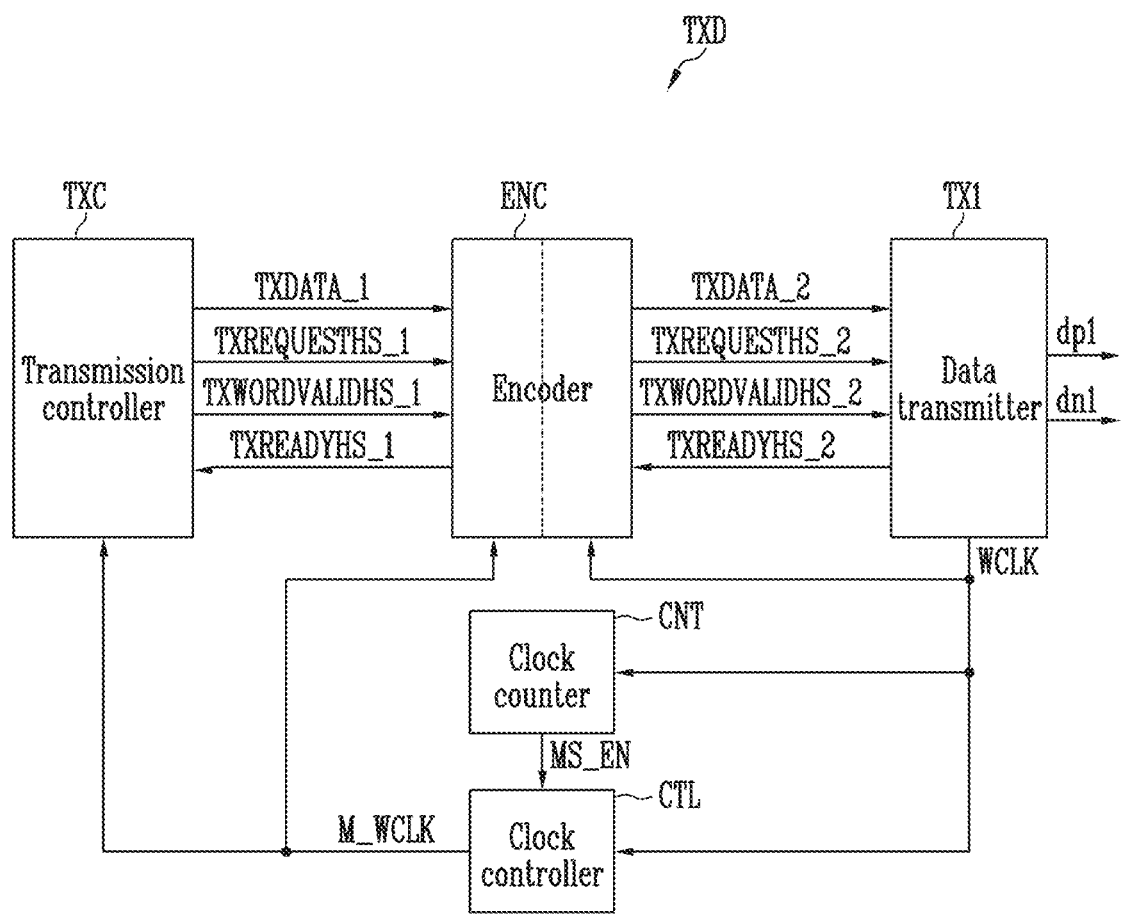
FIG. 9 is a block diagram illustrating an embodiment of a transmitter included in the transceiver of FIGS. 6A and 6B.

FIG. 9 is a block diagram illustrating an embodiment of a transmitter included in the transceiver of FIGS. 6A and 6B.

Referring to FIGS. 6A, 6B, 7, 8, and 9, an embodiment of the transmitter TXD may include a transmission controller TXC, a first data transmitter TX1 (hereinafter referred to as a data transmitter), an encoder ENC, a clock counter CNT, and a clock controller CTL.

The transmission controller TXC may transmit the first transmission data TXDATA_1 including the original payload Payload to the encoder ENC based on a modified clock signal M_WCLK.

In an embodiment, the transmission controller TXC may provide the first transmission request signal TXREQUESTHS_1 and the first indication signal TXWORDVALIDHS_1 to the encoder ENC.

The first transmission request signal TXREQUESTHS_1 may mean a high-speed transmission request. When the first transmission request signal TXREQUESTHS_1 is activated, data for the transition from the first mode mode1 to the second mode mode2 may be output, and valid data including the original payload Payload may be provided from the transmission controller TXC to the encoder ENC.

The first indication signal TXWORDVALIDHS_1 may be a signal defined by the MIPI protocol, and may indicate that data to be transmitted to the encoder ENC is valid data.

In an embodiment, the transmission controller TXC may transmit the first transmission data TXDATA_1 to the encoder ENC based on the modified clock signal M_WCLK, which is a signal obtained by masking the internal clock signal WCLK. In one embodiment, for example, the transmission controller TXC may transmit the first transmission data TXDATA_1 including the original payload Payload to the encoder ENC in synchronization with the gate-on level of the modified clock signal M_WCLK.

The encoder ENC may transmit the second transmission data TXDATA_2 to the data transmitter TX1. In one embodiment, for example, the encoder ENC may receive the first transmission data TXDATA_1 based on the modified clock signal M_WCLK, and may output the second transmission data TXDATA_2 based on the internal clock signal WCLK.

In an embodiment, the encoder ENC may encode at least some of the first transmission data TXDATA_1. In one embodiment, for example, the encoder ENC may encode an original payload Payload included in the first transmission data TXDATA_1 as the first payload ePayload.

The encoder ENC may perform data encoding according to a predetermined protocol. In an embodiment, the encoder ENC may perform data encoding so that data toggling occurs at least once every N (here, N is an integer greater than 2) bit of the first transmission data TXDATA_1. In one embodiment, for example, data may be toggled at least once every 6 bits by encoding of the encoder ENC.

In an embodiment, the encoder ENC may add data before and after (or prior to and subsequent to) the first payload ePayload to generate the second transmission data TXDATA_2.

In an embodiment, the encoder ENC may generate a clock training pattern CLK-T in response to the first transmission request signal TXREQUESTHS_1, and may transmit the clock training pattern CLK-T to the data transmitter TX1.

In one embodiment, for example, the second transmission data TXDATA_2 may sequentially include a clock training pattern CLK-T, a start pattern STP, a first payload ePayload, and an end pattern EDP.

In an embodiment, the encoder ENC may provide the first transmission preparation signal TXREADYHS_1 to the transmission controller TXC. The first transmission preparation signal TXREADYHS_1 may mean a high-speed transmission preparation. When the first transmission preparation signal TXREADYHS_1 is activated, the first transmission data TXDATA_1 may be transmitted to the encoder ENC. In one embodiment, for example, the first transmission data TXDATA_1 may be serially transmitted to the encoder ENC.

In an embodiment, the encoder ENC may provide the second transmission request signal TXREQUESTHS_2 and the second indication signal TXWORDVALIDHS_2 to the data transmitter TX1.

The second transmission request signal TXREQUESTHS_2 may mean a high-speed transmission request. In an embodiment, the encoder ENC may activate the second transmission request signal TXREQUESTHS_2 in response to the first transmission request signal TXREQUESTHS_1. When the second transmission request signal TXREQUESTHS_2 is activated, the encoder ENC may transmit the clock training pattern CLK-T to the data transmitter TX1.

The second indication signal TXWORDVALIDHS_2 may be a signal defined by the MIPI protocol, and may indicate that data to be transmitted to the data transmitter TX1 is valid data.

In an embodiment, the encoder ENC may transmit the second transmission data TXDATA_2 including the first payload ePayload to the data transmitter TX1 in synchronization with the gate-on level of the internal clock signal WCLK provided from the data transmitter TX1.

The data transmitter TX1 may generate the internal clock signal WCLK, and may transmit the second transmission data TXDATA_2 including the clock training pattern CLK-T and the first payload ePayload to the first line dp1 and the second line dp2. The internal clock signal WCLK may be provided to the encoder ENC, the clock counter CNT, and the clock controller CTL. In such an embodiment, the internal clock signal WCLK in the encoder ENC may be used to output the second transmission data TXDATA_2.

The data transmitter TX1 may transmit data for the transition from the first mode mode1 to the second mode mode2 to the receiver RXD in response to the second transmission request signal TXREQUESTHS_2.

The data transmitter TX1 may provide the second transmission preparation signal TXREADYHS_2 to the encoder ENC. The second transmission preparation signal TXREADYHS_2 may indicate a high-speed transmission preparation. When the second transmission preparation signal TXREADYHS_2 is activated, the clock training pattern CLK-T provided to the data transmitter TX1 may be transmitted to the receiver RXD.

Thereafter, the data transmitter TX1 may transmit the first payload ePayload provided from the encoder ENC to the receiver RXD.

In an embodiment, the transmitter TXD may include the clock counter CNT and a clock controller CTL to mask the internal clock signal WCLK during a masking period repeated at a preset cycle.

The clock counter CNT may count the internal clock signal WCLK, and may generate a clock control signal MS_EN (shown in FIG. 12) in response to a preset count value. In one embodiment, for example, the clock counter CNT may count a repetition of the cycle of the internal clock signal WCLK or a repetition of the gate-on level. The clock counter CNT may be implemented as a clock counting circuit of various known hardware configurations and/or software configurations.

In one embodiment, for example, when a count value of the clock counter CNT reaches a preset target value, the clock control signal MS_EN of a gate-on level (or an activation level) may be output, and a count value of the clock counter CNT may be reset. Alternatively, the clock counter CNT may output the clock control signal MS_EN of the gate-on level (or the activation level) whenever a multiple of the target value is counted.

The clock controller CTL may mask some of the internal clock signal WCLK based on the clock control signal MS_EN. In one embodiment, for example, the internal clock signal WCLK may be output at a gate-off level during to a preset masking period based on the clock control signal MS_EN. In one embodiment, for example, the masking period may be one or a half cycle of the internal clock signal WCLK, but a length of the masking period is not limited thereto.

In an embodiment, the clock controller CTL may include a logic circuit such as an AND gate for masking one clock cycle of the internal clock signal WCLK by using the clock control signal MS_EN and the internal clock signal WCLK as an input.

The modified clock signal M_WCLK obtained by masking the internal clock signal WCLK may be provided to the transmission controller TXC. The transmission controller TXC may transmit the first transmission data TXDATA_1 including the original payload Payload to the encoder ENC in synchronization with the gate-on level of the modified clock signal M_WCLK.

In such an embodiment, the modified clock signal M_WCLK may be provided to an input part of the encoder ENC. In such an embodiment, the modified clock signal M_WCLK may be used to input the first transmission data TXDATA_1 in the encoder ENC. The encoder ENC may receive the first transmission data TXDATA_1 in synchronization with the gate-on level of the modified clock signal M_WCLK.

Accordingly, the input of the original payload Payload from the transmission controller TXC to the encoder ENC may be held during the masking period. That is, since the modified clock signal M_WCLK has a gate-off level during the masking period, the input of the first transmission data TXDATA_1 to the encoder ENC may be held (or stopped).

In an embodiment, the transceiver TSCV may include an encoder ENC in the transmitter TXD such that a clock line between the transmitter TXD and the receiver RXD is omitted or removed. Accordingly, the second transmission data TXDATA_2 including the encoded data may include clock information (e.g., the clock training pattern CLK-T) to be restored by the receiver RXD.

In an embodiment, for data encoding with respect to the first transmission data TXDATA_1 before encoding, the second transmission data TXDATA_2 may further include additional data having information of an encoding key. Accordingly, a data amount of the output data (e.g., the second transmission data TXDATA_2) from the encoder ENC may be larger than a data amount of the input data (e.g., the first transmission data TXDATA_1) to the encoder ENC, which may act as data overhead.

In one embodiment, for example, 6 bits of the encoding key may be added every 186 bits of the first transmission data TXDATA_1, and the second transmission data TXDATA_2 of 192 bits may be outputted corresponding to the first transmission data TXDATA_1 of 186 bits. In such an embodiment, the data overhead may be about 3.2% (i.e., 192/186*100≈103.2). For the integrity of data transmission/reception in the transceiver TSCV, the processing time used for the data input to the encoder ENC and the processing time used for the data output from the encoder ENC may be the same as each other. In such an embodiment, the input frequency and output frequency of each of input/output data of the encoder ENC may be maintained to be the same as each other.

When a time corresponding to about 3.2% is added to the input processing time of data having the data overhead of about 3.2%, input/output processing times (or input/output frequencies) for the same original data may be substantially the same or similar to each other. If a memory or the like for controlling data input timing is used for this, a manufacturing cost and a complexity of the transmitter TXD may be increased due to such a memory.

In embodiments of the disclosure, by masking 1 clock cycle per 32 clock cycles of the internal clock signal WCLK, a time (e.g., a holding time for matching data input/output processing times) corresponding to 3.2% may be added to the input processing time of data. In such embodiments, during a time corresponding to 32 clock cycles (i.e., toggling the internal clock signal WCLK 32 times) of the internal clock signal WCLK, the first transmission data TXDATA_1 corresponding to 31 clock cycles (i.e., toggling the internal clock signal WCLK 31 times) of the internal clock signal WCLK, may be supplied to the encoder ENC (i.e., 32/31*100≈103.2). At the same time, the second transmission data TXDATA_2 may be transmitted from the encoder ENC to the data transmitter TX1 in synchronization with 32 clock cycles of the internal clock signal WCLK.

Accordingly, in such embodiments, a time for processing data input to the encoder ENC and a time for processing output of input data may be similar to each other, and the integrity of data transmission/reception may be effectively maintained.

However, the masking period and cycle of the internal clock signal WCLK are not limited thereto. In one embodiment, for example, the masking cycle and the masking period may be adjusted according to a ratio of the data overhead of the encoded data.

Figure 10:
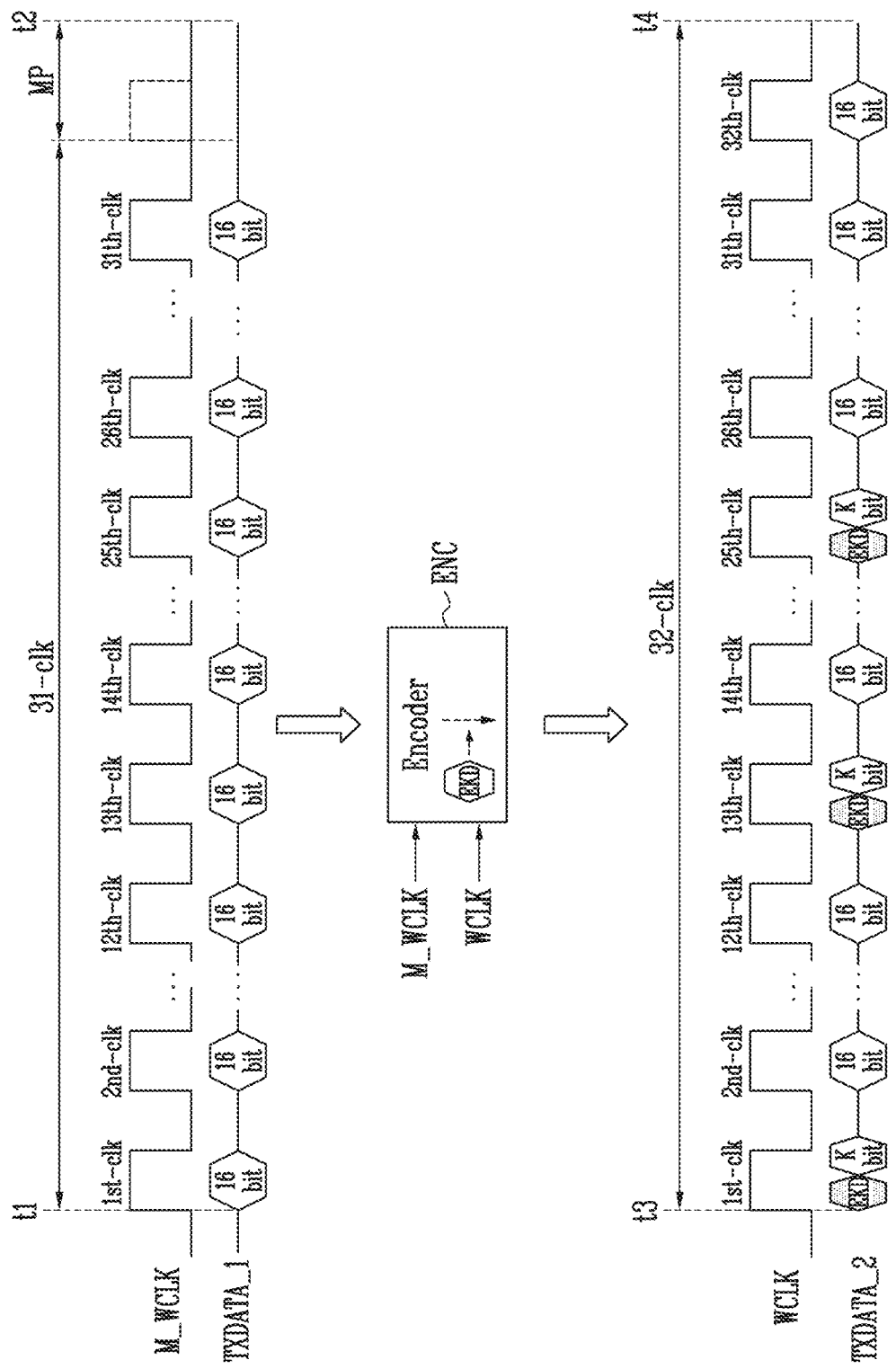
FIG. 10 is a drawing illustrating an embodiment of an operation of the transmitter of FIG. 9.

FIG. 10 is a drawing illustrating an embodiment of an operation of the transmitter of FIG. 9.

Referring to FIGS. 9 and 10, the first transmission data TXDATA_1 may be input to the encoder ENC from a first time point t1 based on the modified clock signal M_WCLK, and the second transmission data TXDATA_2 may be output from the encoder ENC from a third time point t3 based on the internal clock signal WCLK. In one embodiment, for example, the internal clock signal WCLK and the modified clock signal M_WCLK may be provided to the encoder ENC.

In an embodiment, the third time point t3 may be a time point after the first time point t1. In such an embodiment, the third time point t3 may precede or follow a second time point t2.

A period from the first time point t1 to the second time point t2 may be substantially the same as a period from the third time point t3 to a fourth time point t4.

In an embodiment, 16-bit data (e.g., the second transmission data TXDATA_2) may be transmitted corresponding to each of an activation level of the clock cycle of the internal clock signal WCLK. In such an embodiment, 16-bit data (e.g., the first transmission data TXDATA_1) may be transmitted corresponding to each of an activation level of the clock cycle of the modified clock signal M_WCLK.

In an embodiment, as described above, the first transmission data TXDATA_1 including predetermined valid data may be serially transmitted during 31 clock cycles 31-clk among 32 clock cycles of the modified clock signal M_WCLK, and a data value of the first transmission data TXDATA_1 transmitted immediately before by the gate-off level of the modified clock signal M_WCLK may be held (or maintained) in the masking period MP, which is the 32-th clock cycle of a clock signal. Here, the gate-off level may be understood as a logic low level.

Accordingly, a total of 496 bits of the first transmission data TXDATA_1 may be supplied to the encoder ENC during the period from the first time point t1 to the second time point t2 including the masking period MP (e.g., 16*31=496).

Additional data corresponding to the encoding key EKD may be inserted by data encoding of the encoder ENC. In an embodiment, the second transmission data TXDATA2 may include the first transmission data TXDATA1 in which the encoding key EKD is inserted. In one embodiment, for example, 6 bits of the encoding key EKD may be inserted for every 186 bits of valid data. The encoding key EKD may be inserted and transmitted prior to the valid data. Then, the receiver RXD may decode the valid data following the encoding key EKD based on the encoding key EKD.

In one embodiment, for example, as shown in FIG. 10, the encoding key EKD and the valid data of K bits (here, K is a natural number) may be transmitted (or output) as the second transmission data TXDATA_2 corresponding to the first clock cycle 1st-clk. In an embodiment, where the encoding key EKD is 6 bits, valid data output in the first clock cycle 1st-clk may be 10 bits. Subsequently, a total of 186 bits of valid data may be serially transmitted (or output) until the 12-th clock cycle 12th-clk.

Thereafter, 6 bits of the encoding key EKD and 10 bits of valid data may be output as the second transmission data TXDATA_2 in the 13-th clock cycle 13th-clk. In such an embodiment, a total of 186 bits of valid data may be serially transmitted (outputted) up to the 24-th clock cycle.

Similarly, in the 25-th clock cycle 13th-clk, 6 bits of the encoding key EKD and 10 bits of valid data may be output as the second transmission data TXDATA_2. Thereafter, valid data may be serially transmitted (outputted) up to the 32-nd clock cycle.

That is, during the period from the third time point t3 to the fourth time point t4, the valid data (e.g., data (e.g., the second transmission data TXDATA_2) in which the first transmission data TXDATA_1 is encoded) supplied to the encoder ENC during the period from the first time point t1 to the second time point t2 may be transmitted to the first and second lines dp1 and dn1 through the data transmitter TX1.

However, the time point at which the encoding key EKD is transmitted and the clock cycle at which it is transmitted are not limited thereto during the period from the third time point t3 to the fourth time point t4. FIG. 10 show only a partial period of the data transmission process, and the encoding key EKD may be transmitted at other clock cycles. In one embodiment, for example, the encoding key EKD may be inserted and transmitted every 186 bits of valid data regardless of the 32-th clock cycle 32-clk. In an embodiment, the encoding key EKD may be transmitted during or after transmission of the valid data corresponding to one clock cycle. In one embodiment, for example, 6 bits of the encoding key EKD may be transmitted after 10 bits of valid data are transmitted corresponding to one clock cycle.

According to an embodiment, the last 2 bits of valid data input in the 31-th clock cycle 31-clk of the input of the encoder ENC may be output from the encoder ENC at the 33-th clock cycle of the internal clock signal WCLK after the fourth time point t4.

In an embodiment, as described above, a length of the input processing time of data and a length of the output processing time of the corresponding data may be substantially the same as or similar to each other in the encoder ENC, and an input frequency (e.g., an input time) of valid data and an output frequency (e.g., an output time) of the corresponding valid data may be substantially the same as (or synchronized with) each other in the encoder ENC.

Figure 11:
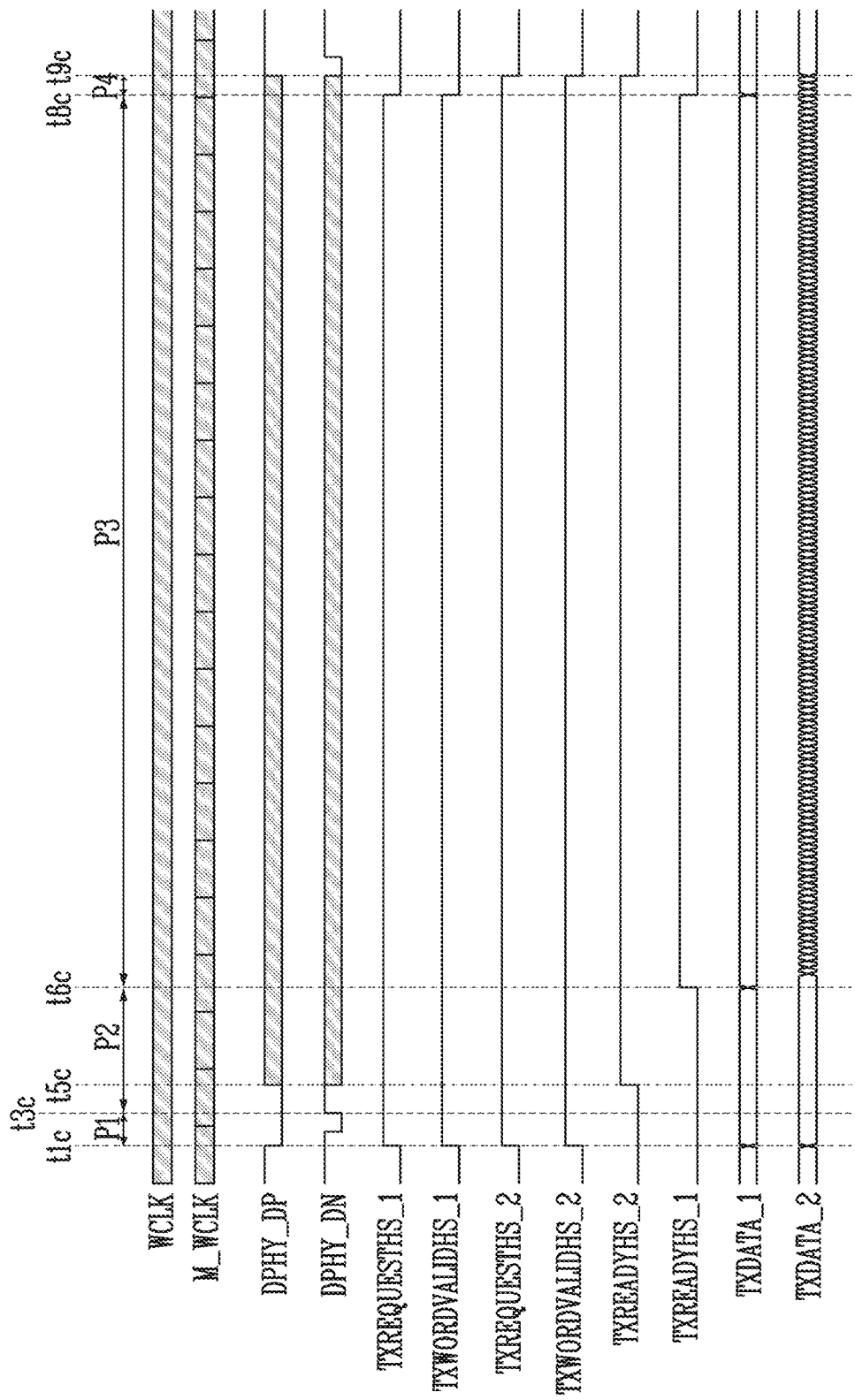
FIG. 11 is a timing diagram illustrating an embodiment of an operation of the transmitter of FIG. 9.

FIG. 11 is a timing diagram illustrating an embodiment of an operation of the transmitter of FIG. 9.

Referring to FIGS. 8, 9, and 11, the transmitter TXD may transmit data based on the MIPI protocol.

Hereinafter, the operations of the transmitter TXD from first to tenth time points t1c to t10c will be described in connection with the operation thereof described above with reference to FIG. 8.

Before the first time point t1c, a stop of the first mode mode1 may be instructed through the output of the pattern LP-11.

At the first time point t1c, the first transmission request signal TXREQUESTHS_1 and the second transmission request signal TXREQUESTHS_2 may be activated to a logic high level (or a gate-on level). When the first transmission request signal TXREQUESTHS_1 is activated, the first transmission data TXDATA1 including the original payload Payload that is valid data may be transmitted from the transmission controller TXC to the encoder ENC. At this time, since the first transmission preparation signal TXREADYTH_1 is in an inactive state, the output of the encoder ENC may be a state before the output of the first transmission data TXDATA1 (or data obtained by encoding the first transmission data TXDATA1).

When the second transmission request signal TXREQUESTHS_2 is activated, the encoder ENC may transmit the second transmission data TXDATA2 including the clock training pattern CLK-T to the data transmitter TX1. At this time, since the second transmission preparation signal TXREADYHS_2 is in an inactive state, the output of the data transmitter TX1 may be a state before a start of clock training.

In an embodiment, the first indication signal TXWORDVALIDHS_1 may be output in synchronization with the first transmission request signal TXREQUESTHS_1, and the second indication signal TXWORDVALIDHS_2 may be output in synchronization with the second transmission request signal TXREQUESTHS_2.

The first period P1 between the first time point t1c and the third time point t3c may be a transition period from the first mode mode1 to the second mode mode2. The first output DPHY_DP may be an output to the first line dp1, and the second output DPHY_DN may be an output to the second line dp2. The first output DPHY_DP and the second output DPHY_2 in the first period P1 may be outputs in a transient period set by a communication protocol.

In such an embodiment, as described above, during the first period P1, the transmission controller TXC may transmit the valid data to the encoder ENC, and the encoder ENC may transmit the clock training pattern CLK-T to the data transmitter.

At the third time point t3c, the second mode mode2 may be entered. Accordingly, the first output DPHY_DP and the second output DPHY_2 may be output in a differential mode.

In an embodiment, during the period of the third time point t3c to the fifth time point t5c, the first pattern HS-zero and the second pattern HS-sync may be first transmitted to the receiver RXD based on the MIPI protocol.

At the fifth time point t5c, the second transmission preparation signal TXREADYHS_2 may be activated. When the second transmission preparation signal TXREADYHS_2 is activated, the clock training pattern CLK-T may be output from the data transmitter TX1, and the clock training may be started in the receiver RXD by the clock training pattern CLK-T. Accordingly, the clock training pattern CLK-T may be transmitted to the receiver RXD during the period from the fifth time point t5c to the sixth time point t6c.

As such, the second period P2 between the third time point t3c and the sixth time point t6c may correspond to a start of the second mode mode2 and a clock training period.

In an embodiment, since the first transmission preparation signal TXREADYHS_1 is in an inactive state in the second period P2, a transmission of the first transmission data TXDATA_1 may be in a hold state, and a transmission of the second transmission data TXDATA_2 based on the first transmission data TXDATA_1 may also be in a hold state. That is, in the second period P2, the data transmitter TX1 may transmit the clock training pattern CLK-T to the receiver RXD.

At the sixth time point t6c, the first transmission preparation signal TXREADYHS_1 may be activated. When the first transmission preparation signal TXREADYHS_1 is activated, the first transmission data TXDATA_1 including the original payload Payload may be transmitted again from the transmission controller TXC to the encoder ENC.

The encoder ENC may encode the first transmission data TXDATA_1 and may transmit it to the data transmitter TX1 as the second transmission data TXDATA_2. A time delay may occur between an activation of the first transmission preparation signal TXREADYHS_1 and a start of outputting the second transmission data TXDATA_2 due to the time required for data encoding.

According to an embodiment, the second transmission data TXDATA_2 output from the encoder ENC after the sixth time point t6c may correspond to data in which the first transmission data TXDATA_1 provided from the transmission controller TXC from the first time point t1c is encoded and sequentially output.

The third period P3 between the sixth time point t6c and the ninth time point t9c, may be a period in which the start pattern STP, the first payload ePayload, and the end pattern EDP are sequentially transmitted to the receiver RXD.

At the eighth time point t8c, the first transmission request signal TXREQUESTHS_1 and the first transmission preparation signal TXREADY_1 may be deactivated. Accordingly, a transmission of the first transmission data TXDATA1 including the original payload Payload may end.

In the fourth period P4 between the eighth time point t8c and the ninth time point t9c, the second transmission request signal TXREQUESTHS_2 and the second transmission preparation signal TXREADY_2 may maintain an activated state. In the fourth period P4, the end pattern EDP may be output. In addition, all of the remainder of the second transmission data TXDATA_2 delayed in the encoder ENC during the fourth period P4 may be transmitted to the receiver RXD through the data transmitter TX1.

At the ninth time point t9c, the second transmission request signal TXREQUESTHS_2 and the second transmission preparation signal TXREADY_2 may be deactivated. Accordingly, a data transmission of the encoder ENC may end. Thereafter, the transceiver TSCV including the data transmitter TX1 may be transitioned to the first mode mode1.

Figure 12:
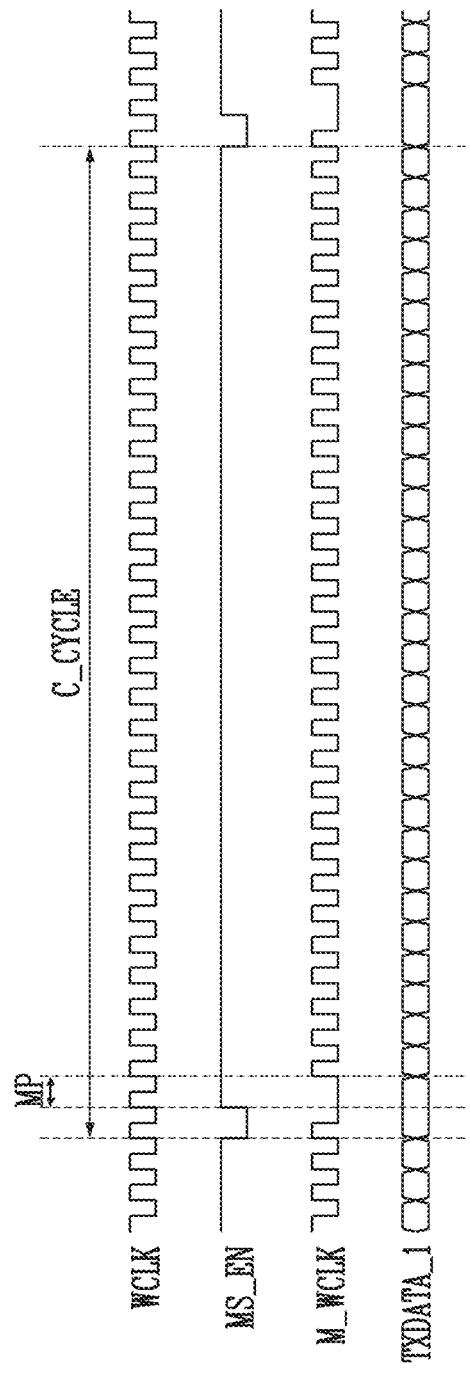
FIG. 12 is a timing diagram illustrating an embodiment of masking the internal clock signal of FIG. 11.

FIG. 12 is a timing diagram illustrating an embodiment of masking the internal clock signal of FIG. 11.

Referring to FIGS. 9, 10, 11, and 12, the clock counter CNT may count the internal clock signal WCLK to cyclically activate the clock control signal MS_EN.

In one embodiment, for example, as shown in FIG. 12, the clock control signal MS_EN may be activated in the 32-th clock cycle of the internal clock signal WCLK. In FIG. 12, the 32-th clock cycle of the internal clock signal WCLK may be expressed as C_CYCLE.

The clock controller CTL may mask the internal clock signal WCLK of one clock cycle corresponding to the masking period MP in response to the clock control signal MS_EN. Accordingly, the modified clock signal M_WCLK having a gate-off level (or a deactivation level or a logic low level) may be generated during the masking period MP.

The modified clock signal M_WCLK may be supplied to the input terminal of the encoder ENC and the transmission controller TXC. The transmission controller TXC may serially transmit the first transmission data TXDATA_1 every one clock cycle of the modified clock signal M_WCLK. The encoder ENC may also receive the first transmission data TXDATA_1 every clock cycle of the modified clock signal M_WCLK. Accordingly, the input of the first transmission data TXDATA_1 to the encoder ENC may be held (or stopped) during the masking period MP.

In an embodiment, as described above, the transceiver TSCV may perform data communication through data including clock information using the MIPI protocol without a clock line. Accordingly, in such an embodiment, since the clock line is removed, the additional space and cost for the clock line may be reduced, and power consumption may also be reduced.

In such an embodiment, the transmitter TXD cyclically masks the internal clock signal WCLK to prevent or minimize a data communication error due to a difference in data input/output processing time for the same valid data in the encoder ENC due to data overhead. Accordingly, the data input processing frequency and the data output processing frequency of the encoder ENC may be substantially the same as (or synchronized with) each other, and integrity of data transmission/reception may be maintained.

In such an embodiment, by substantially synchronizing the data input processing frequency and the data output processing frequency of the encoder ENC only by masking the internal clock signal without an additional generation of a clock signal or a memory for the integrity of data transmission/reception, an increase in circuit complexity may be minimized, and the cost may be reduced.

Figure 13:
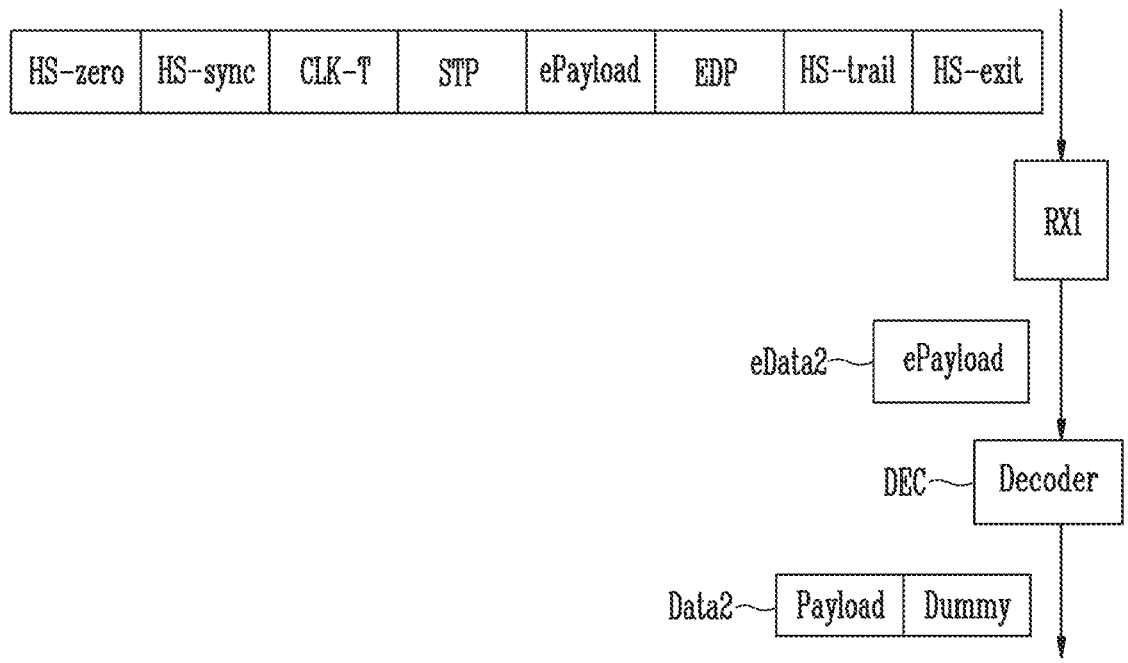
FIG. 13 is a drawing illustrating an embodiment of an operation of a receiver included in the transceiver of FIGS. 6A and 6B.

FIG. 13 is a drawing illustrating an embodiment of an operation of a receiver included in the transceiver of FIGS. 6A and 6B.

Referring to FIGS. 5, 6A, 6B, and 13, the first data receiver RX1 may provide the second encoded data eData2 including the first payload ePayload to the decoder DEC.

The decoder DEC may decode the second encoded data eData2 (i.e., the first payload ePayload) to generate the second data Data2, and may provide the generated second data Data2 to the reception controller RXC.

The second data Data2 may include a second payload Payload and a dummy pattern. Since the second payload Payload is the same as the original payload of the first data Data1 provided by the transmission controller TXC, the second payload Payload does not include separate phase information.

The dummy pattern Dummy may be pre-encoded to be embedded in the first payload ePayload by the encoder ENC, or may be added by the decoder DEC. The dummy pattern Dummy may be data in which a same value is repeated.

In one embodiment, for example, when the last value of the second payload Payload is 0, the dummy pattern Dummy may be data in which 1 is repeated, and when the last value of the second payload Payload is 1, the dummy pattern Dummy may be data in which 0 is repeated. Accordingly, since a format (i.e., the payload Payload and dummy pattern Dummy) of the second data Data2 received by the reception controller RXC of FIG. 6A is the same as a format (i.e., the payload Payload and additional information C) of the second data Data2 received by the reception controller RXCr of FIG. 2, the MIPI protocol interface may not be changed even if the clock line is removed from the transceiver TSCV.

Similar to a case of the second data Data2 described with reference to FIG. 5, a format of signals (i.e., RxActiveHS, RxValidHS, RxSyncHS, and RxByteClkHS) generated by the receiver RXD (e.g., the first data receiver RX1), may be the same as a format of signals (i.e., RxActiveHS, RxValidHS, RxSyncHS, and RxByteClkHS) generated by the receiver RXDr (e.g., the first data receiver RX1r) described with reference to FIGS. 1 and 2. Therefore, in such an embodiment, the MIPI protocol interface may be effectively used without any change made thereto even if the clock line is removed from the transceiver TSCV.

Since the transmission of the second data Data2 and level changes of the signals RxActiveHS, RxValidHS, RxSyncHS, and RxByteClkHS are substantially the same as those described above with reference to FIG. 5, any repetitive detailed description thereof will be omitted.

The second data Data2 may include a second payload Payload composed of byte units B1, B2, B3, B4, B5, ..., Bn and additional information C. Here, the additional information C may be information corresponding to the dummy pattern Dummy, not the pattern HS-trail. In one embodiment, for example, the additional information C may be 8-bit information in which 0 is repeated or 1 is repeated. In one embodiment, for example, the first data receiver RX1 may parallelize the second payload Payload and the dummy pattern Dummy of the decoded second data Data2 through a deserializer (e.g., parallelize with 8 lines), and may transmit the parallelized second data Data2 to the reception controller RXC.

Figure 14:
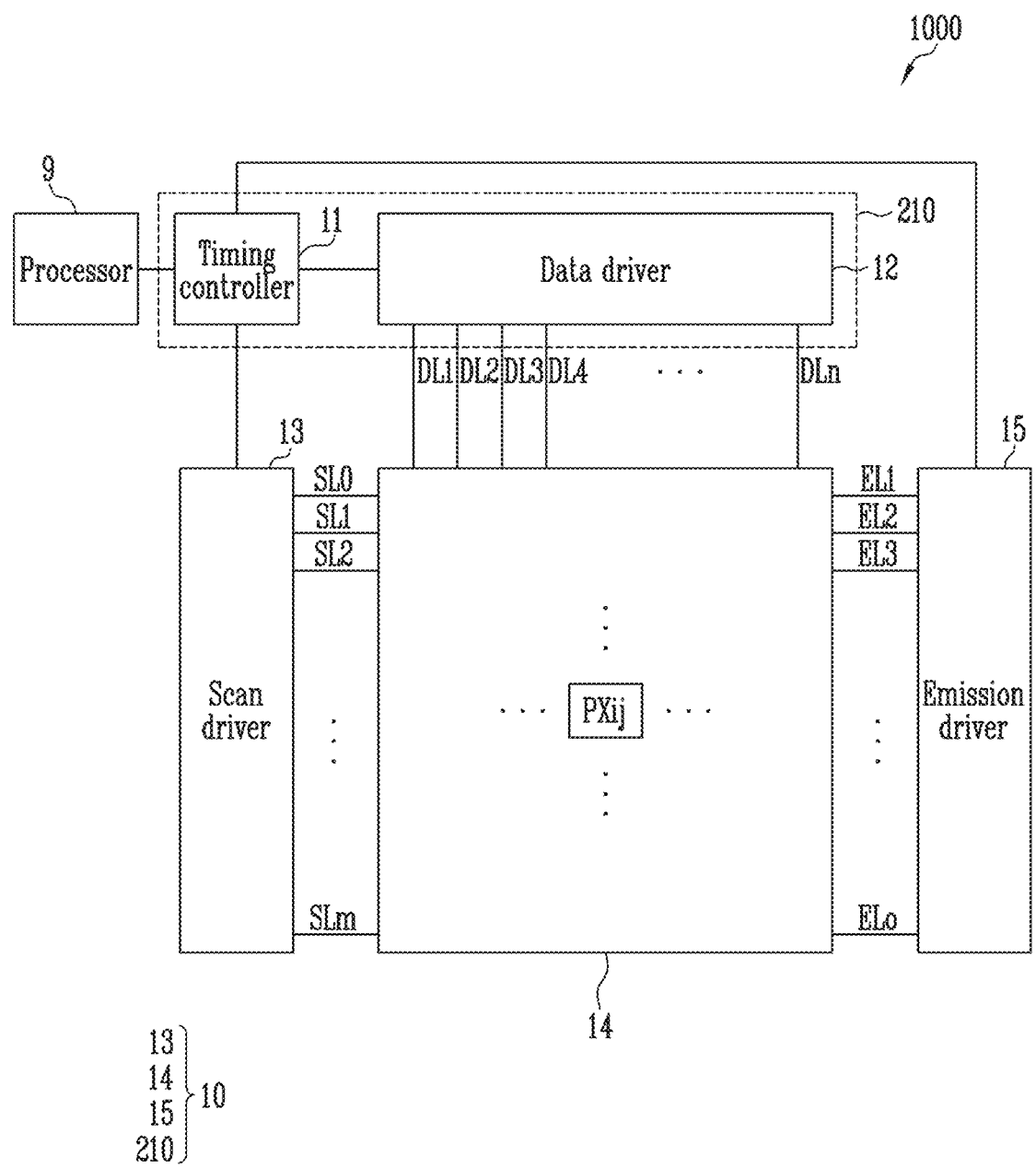
FIG. 14 is a block diagram illustrating a display system according to an embodiment of the invention.

FIG. 14 is a block diagram illustrating a display system according to an embodiment of the invention.

Referring to FIGS. 6A and 14, an embodiment of the display system 1000 may include a display module 10 and a processor 9.

In an embodiment, the transceiver (e.g., the transceiver TSCV of FIG. 6A or FIG. 6B) may be used for communication and data transmission/reception between the display module 10 and the processor 9.

The display module 10 may include a timing controller 11, a data driver 12, a scan driver 13, a pixel unit 14, and an emission driver 15. In such an embodiment, functional units of the display module 10 may be integrated into a single IC, integrated into a plurality of ICs, or mounted on a display substrate according to a specification of a display device. In one embodiment, for example, the timing controller 11 and the data driver 12 may be integrated into a single IC to form one display driver 210. In such an embodiment, the display driver 210 may be referred to as the TED described above. According to a type, the display driver 210 may further include at least one selected from the scan driver 13 and the emission driver 15.

The processor 9 may correspond to at least one selected from a GPU, a CPU, an AP, and the like. In an embodiment, the processor 9 may output image data to be used in the display module 10.

The processor 9 may include the transmitter TXD described above. In an embodiment, the timing controller 11, the data driver 12, or the display driver 210 may include the above-described receiver RXD (see FIG. 6A).

The timing controller 11 may receive grayscales and timing signals for each display frame period from the processor 9. The timing signals may include a vertical synchronization signal, a horizontal synchronization signal, a data enable signal, and the like.

The timing controller 11 may provide rendered or non-rendered grayscales to the data driver 12. Also, the timing controller 11 may provide a data driving control signal to the data driver 12.

The timing controller 11 may provide a scan driving control signal to the scan driver 13 and a light-emitting driving control signal to the emission driver 15.

The data driver 12 may generate data voltages (i.e., data signals) to be provided to data lines DL1, DL2, DL3, DL4, ..., DLn (here, n is an integer greater than 0) by using the grayscales and the data driving control signal received from the timing controller 11.

The scan driver 13 may generate scan signals to be provided to scan lines SL0, SL1, SL2, ..., SLm (here, m is an integer greater than 0) by using the scan driving control signal (e.g., a clock signal, a scan start signal, etc.) received from the timing controller 11. The scan driver 13 may sequentially supply scan signals having a pulse of a turn-on level to the scan lines SL0, SL1, SL2, ..., SLm.

The emission driver 15 may generate light-emitting control signals to be provided to light-emitting control lines EL1, EL2, EL3, ... ELo (here, o is an integer greater than 0) by using the light-emitting control signal (e.g., a clock signal, a light-emitting control start signal, etc.) received from the timing controller 11. The emission driver 15 may sequentially supply the light-emitting control signals to the light-emitting control lines EL1, EL2, EL3, ..., ELo.

The pixel unit 14 may include pixels PXij (here, i is a positive integer less than or equal to m, and j is a positive integer less than or equal to n). The pixel PXij may be connected to the data line, the scan line, and the light-emitting control line corresponding thereto. The pixel PXij may emit light with luminance corresponding to the data signal.

The invention should not be construed as being limited to the embodiments set forth herein. Rather, these embodiments are provided so that this disclosure will be thorough and complete and will fully convey the concept of the invention to those skilled in the art.

While the invention has been shown and described with reference to embodiments thereof, it will be understood by those skilled in the art that various changes in forms and details may be made therein without departing from the spirit and scope of the invention as defined by the following claims.

What is claimed is:

1. A transceiver comprising:
    a transmitter and a receiver connected to each other by a first line and a second line, wherein
    the transmitter transmits signals having a first voltage range to the first line and the second line in a first mode, and transmits signals having a second voltage range smaller than the first voltage range to the first line and the second line in a second mode, and
    the transmitter encodes an original payload in the second mode to generate a first payload, and transmits a clock training pattern and the first payload through the first line and the second line,
    wherein
    the first line and the second line are used in a single-ended manner in the first mode, and
    the first line and the second line are used in a differential manner in the second mode.

2. The transceiver of claim 1, wherein the transmitter masks an internal clock signal used for delivery of the original payload during a masking period repeated at a preset cycle.

3. The transceiver of claim 2, wherein the transmitter comprises:
    a transmission controller which transmits the original payload based on the internal clock signal, and generates a first transmission request signal in the second mode;
    a data transmitter which generates the internal clock signal, and transmits the clock training pattern and the first payload to the first line and the second line;
    an encoder which encodes the original payload provided from the transmission controller into the first payload including an encoding key, and transmits the clock training pattern to the data transmitter in response to the first transmission request signal;
    a clock counter which counts the internal clock signal, and generates a clock control signal in response to a preset count value; and
    a clock controller which masks some of the internal clock signal based on the clock control signal, and provides a modified clock signal modified by the masking to the transmission controller and the encoder.

4. The transceiver of claim 3, wherein the internal clock signal is output at a gate-off level during the masking period.

5. The transceiver of claim 4, wherein an input of the original payload to the encoder is held during the masking period.

6. The transceiver of claim 3, wherein
    the transmission controller transmits the original payload to the encoder in synchronization with a gate-on level of the modified clock signal, and
    the encoder receives the original payload in synchronization with the gate-on level of the modified clock signal.

7. The transceiver of claim 6, wherein the encoder outputs the first payload to the data transmitter in synchronization with the gate-on level of the internal clock signal.

8. The transceiver of claim 3, wherein, in the second mode, the encoder further generates a start pattern transmitted between the clock training pattern and the first payload, and further generates an end pattern transmitted after the first payload.

9. The transceiver of claim 8, wherein the data transmitter sequentially transmits an HS-zero pattern and an HS-sync pattern before transmitting the clock training pattern, and sequentially transmits an HS-trail pattern and an HS-exit pattern after transmitting the end pattern.

10. The transceiver of claim 3, wherein
    the encoder provides a first transmission preparation signal to the transmission controller, and
    the data transmitter provides a second transmission preparation signal to the encoder.

11. The transceiver of claim 10, wherein
    the first transmission request signal is activated and the first and second transmission preparation signals are deactivated in a first period, and
    the encoder transmits the clock training pattern to the data transmitter in the first period.

12. The transceiver of claim 11, wherein
    the second transmission preparation signal is activated and the first transmission preparation signal is deactivated in a second period, and
    the data transmitter transmits the clock training pattern to the first line and the second line in the second period.

13. A method of driving a transceiver including a transmitter and a receiver connected to each other by a first line and a second line, the method comprising:
    transmitting signals having a first voltage range from the transmitter to the receiver in a first mode; and transmitting signals having a second voltage range smaller than the first voltage range from the transmitter to the receiver in a second mode, wherein the transmitting the signals having the second voltage range comprises:

transmitting a clock training pattern from the transmitter to the receiver through the first line and the second line; and generating a first payload by encoding an original payload in an encoder included in the transmitter and transmitting the first payload from the transmitter to the receiver through the first line and the second line, wherein the first line and the second line are used in a single-ended manner in the first mode, and the first line and the second line are used in a differential manner in the second mode.

14. The driving method of claim 13, wherein the transmitting the first payload comprises:

counting an internal clock signal of the transmitter to mask some of the internal clock signal;

inputting the original payload to the encoder based on a modified clock signal modified by the masking;

encoding the original payload into the first payload using an encoding key; and outputting the first payload from the encoder based on the internal clock signal.

15. The driving method of claim 14, wherein the modified clock signal is output at a gate-off level during a masking period repeated at a preset cycle.

16. The driving method of claim 14, wherein an input of the original payload to the encoder is held during a masking period repeated at a preset cycle.

17. The driving method of claim 14, wherein encoding the original payload comprises:

generating a start pattern transmitted between the clock training pattern and the first payload and an end pattern transmitted after the first payload.

18. A display system comprising:

a processor which outputs image data;

a display module which displays an image based on the image data; and a transceiver which transmits and receives data between the processor and the display module, wherein the transceiver comprises a transmitter and a receiver connected to each other by a first line and a second line, the transmitter transmits signals having a first voltage range to the first line and the second line in a first mode, and transmits signals having a second voltage range smaller than the first voltage range to the first line and the second line in a second mode, the transmitter encodes an original payload in the second mode to generate a first payload, and transmits a clock training pattern and the first payload through the first line and the second line, and the transmitter masks an internal clock signal used for delivery of the original payload during a masking period which is repeated at a preset cycle.

* * * * *